US012580619B2

(12) United States Patent
Beidas

(10) Patent No.: US 12,580,619 B2
(45) Date of Patent: Mar. 17, 2026

(54) CHANNEL STATE INFORMATION ACQUISITION FOR LINE-OF-SIGHT MIMO FEEDER LINKS IN MULTIBEAM SATELLITE SYSTEMS

(71) Applicant: HUGHES NETWORK SYSTEMS, LLC, Germantown, MD (US)

(72) Inventor: Bassel F. Beidas, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 973 days.

(21) Appl. No.: 17/566,501

(22) Filed: Dec. 30, 2021

(65) Prior Publication Data

US 2023/0059018 A1 Feb. 23, 2023

Related U.S. Application Data

(60) Provisional application No. 63/231,369, filed on Aug. 10, 2021.

(51) Int. Cl.
*H04B 7/06* (2006.01)
*H04B 7/0417* (2017.01)
*H04B 7/185* (2006.01)

(52) U.S. Cl.
CPC ......... *H04B 7/0626* (2013.01); *H04B 7/0417* (2013.01); *H04B 7/0639* (2013.01); *H04B 7/18519* (2013.01)

(58) Field of Classification Search
CPC ................ H04B 7/0626; H04B 7/0417; H04B 7/0639; H04B 7/18519; H04B 7/0413; H04B 7/18517; H04B 7/18513; H04L 25/0258
See application file for complete search history.

(56) References Cited

U.S. PATENT DOCUMENTS

2009/0280747 A1* 11/2009 Sudarshan ............ H04L 25/021
                                              455/63.1
2018/0132122 A1    5/2018 Yoo et al.
(Continued)

FOREIGN PATENT DOCUMENTS

EP          4054226          9/2022
EP          4054226 A1 *    9/2022 ............. H04B 1/707
WO    WO 2021/084777        5/2021

OTHER PUBLICATIONS

Beidas, Bassel F., "Radio-Frequency Impairments Compensation in Ultra High-Throughput Satellite System," IEEE Transactions on Communications, vol. 67, No. 9, Sep. 2019, p. 6025-6038.

(Continued)

*Primary Examiner* — Sujoy K Kundu
*Assistant Examiner* — Raul Rivas
(74) *Attorney, Agent, or Firm* — Sheppard, Mullin, Richter & Hampton LLP

(57) ABSTRACT

Some implementations describe a method including: receiving, by multiple receivers of multiple gateways of a ground receiver system, from multiple transmitters of a satellite over a downlink of a LoS MIMO feeder link, multiple RF signals; obtaining, at the ground receiver system, from the RF signals, preamble signals and pilot signals including first sequences of pilot symbols associated with second sequences of pilot symbols transmitted by the transmitters; estimating, based on the first sequences of pilot symbols and second sequences of pilot symbols, first channel state information (CSI) of the pilot signals; estimating, using the first CSI, frequency offsets and phase offsets of links between the receivers and the transmitters; adjusting, based at least on the frequency offsets and the phase offsets, the preamble signals to obtain adjusted preamble signals; and estimating, (Continued)

at the ground receiver system, using the adjusted preamble signals, second CSI of the downlink.

15 Claims, 15 Drawing Sheets

(56)                    References Cited

U.S. PATENT DOCUMENTS

2019/0199493 A1 *    6/2019   Murakami ........... H04B 7/0413
2019/0273643 A1 *    9/2019   Dong ................. H04L 25/0202

OTHER PUBLICATIONS

Invitation to Pay Additional Fees mailed Nov. 23, 2022 for International Application No. PCT/US2022/039834, filed on Aug. 9, 2022.
International Search Report and Written Opinion mailed Jan. 13, 2023 for International Application No. PCT/US2022/039834, filed on Aug. 9, 2022.

* cited by examiner

200

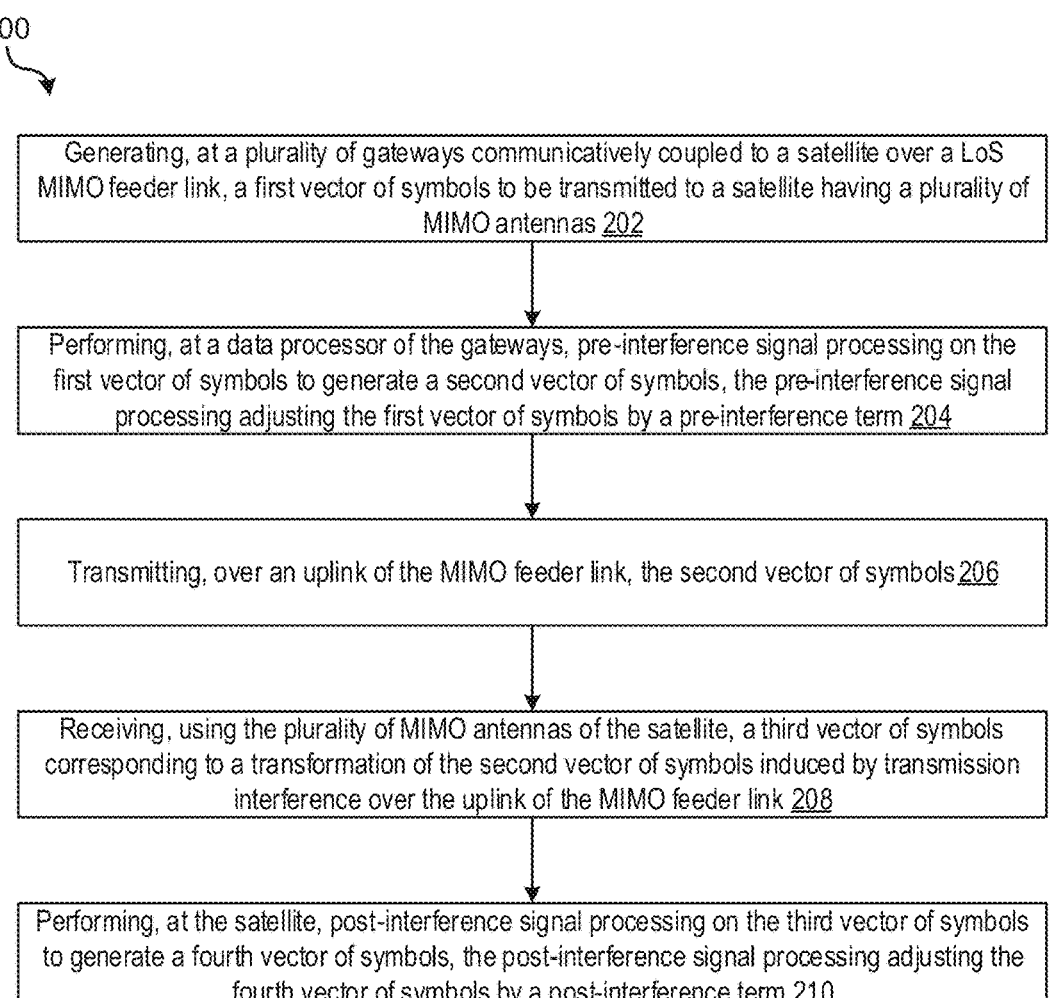

Generating, at a plurality of gateways communicatively coupled to a satellite over a LoS MIMO feeder link, a first vector of symbols to be transmitted to a satellite having a plurality of MIMO antennas 202

Performing, at a data processor of the gateways, pre-interference signal processing on the first vector of symbols to generate a second vector of symbols, the pre-interference signal processing adjusting the first vector of symbols by a pre-interference term 204

Transmitting, over an uplink of the MIMO feeder link, the second vector of symbols 206

Receiving, using the plurality of MIMO antennas of the satellite, a third vector of symbols corresponding to a transformation of the second vector of symbols induced by transmission interference over the uplink of the MIMO feeder link 208

Performing, at the satellite, post-interference signal processing on the third vector of symbols to generate a fourth vector of symbols, the post-interference signal processing adjusting the fourth vector of symbols by a post-interference term 210

FIG. 2

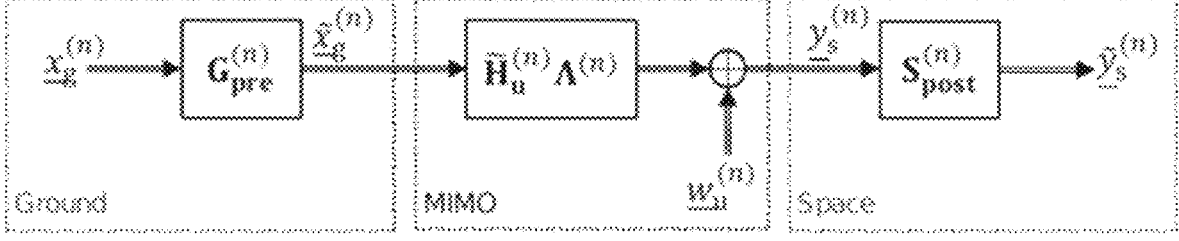

FIG. 3

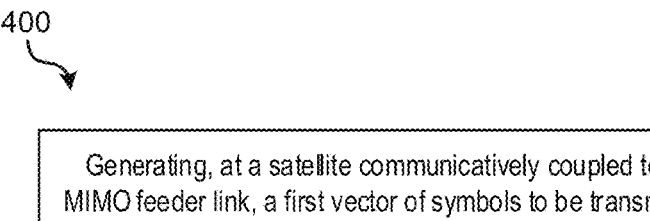

400

Generating, at a satellite communicatively coupled to a plurality of gateways over a LoS MIMO feeder link, a first vector of symbols to be transmitted to the plurality of gateways 402

Performing, at the satellite, pre-interference signal processing on the first vector of symbols to generate a second vector of symbols, the pre-interference signal processing adjusting the first vector of symbols by a pre-interference term 404

Transmitting, over a downlink of the MIMO feeder link, using a plurality of MIMO antennas of the satellite, the second vector of symbols 406

Receiving, at the plurality of gateways, a third vector of symbols corresponding to a transformation of the second vector of symbols induced by transmission interference over the downlink of the MIMO feeder link 408

Performing, at a data processor of the gateways, post-interference signal processing on the third vector of symbols to generate a fourth vector of symbols, the post-interference signal processing adjusting the fourth vector of symbols by a post-interference term 410

FIG. 4

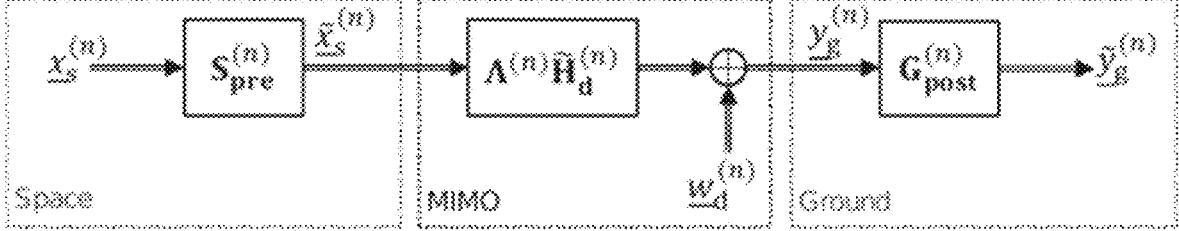

FIG. 5

600

Receiving, by multiple receivers of multiple gateways of a ground receiver system, from multiple transmitters of a satellite over a downlink of a LoS MIMO feeder link, multiple radio frequency (RF) signals 610

Obtaining, at the ground receiver system, from the RF signals, preamble signals and pilot signals, the pilot signals including first sequences of pilot symbols associated with second sequences of pilot symbols transmitted by the transmitters 620

Estimating, at the ground receiver system, based on the first sequences of pilot symbols and the second sequences of pilot symbols, first CSI of the pilot signals 630

Estimating, at the ground receiver system, using the first CSI of the pilot signals, frequency and phase offsets of links between the receivers and the transmitters 640

Adjusting, at the ground receiver system, based at least on the frequency and phase offsets, the preamble signals to obtain adjusted preamble signals 650

Estimating, at the ground receiver system, using the adjusted preamble signals, second CSI for the downlink 660

Preamble 711

Payload 713

Pilot 714-A

Pilot 714-N

Payload 713

CHANNEL STATE INFORMATION ACQUISITION FOR LINE-OF-SIGHT MIMO FEEDER LINKS IN MULTIBEAM SATELLITE SYSTEMS

CROSS-REFERENCE TO RELATED APPLICATIONS

This application claims priority to U.S. Provisional Application No. 63/231,369 filed Aug. 10, 2021 and titled "Channel State Information (CSI) Acquisition for Line-of-Sight MIMO Feeder Links in Multibeam Satellite Systems", which is incorporated herein by reference in its entirety.

BACKGROUND

Wireless multiple-input multiple-output (MIMO) technology allows for higher throughput for the same spectrum because of its ability to transmit and receive multiple data streams simultaneously. For many current state-of-the-art systems that employ MIMO, there is a requirement for a non-line-of-sight and scatter-rich channels such as is often found in terrestrial wireless networks. However, some communication links may require highly directional antennas that have a direct line-of-sight (LoS) component dominating the transmission. For example, LoS conditions, rather than scatter-rich, are encountered in geostationary satellite systems.

Some current satellites systems that implement MIMO require the use of multiple satellites with one MIMO antenna each, a costly implementation. Alternatively, some current satellite systems employ smart gateway diversity, but only using single-input single-output (SISO) feeder links, not taking advantage of cooperation among the multiple transmit and receive antennas.

SUMMARY

The disclosure relates to a MIMO-enabled multibeam satellite system that may achieve spatial orthogonality of independent signals transmitted in LoS channels, where these signals may use the same time, frequency, and/or polarization resources.

In one embodiment, a method, comprises: receiving, by multiple receivers of multiple gateways of a ground receiver system, from multiple transmitters of a satellite over a downlink of a LoS MIMO feeder link, multiple radio frequency (RF) signals; obtaining, at the ground receiver system, from the RF signals, preamble signals and pilot signals, the pilot signals including first sequences of pilot symbols associated with second sequences of pilot symbols transmitted by the transmitters; estimating, at the ground receiver system, based on the first sequences of pilot symbols and the second sequences of pilot symbols, first channel state information (CSI) of the pilot signals; estimating, at the ground receiver system, using the first CSI of the pilot signals, frequency offsets and phase offsets of links between the receivers and the transmitters; adjusting, at the ground receiver system, based at least on the frequency offsets and the phase offsets, the preamble signals to obtain adjusted preamble signals; and estimating, at the ground receiver system, using the adjusted preamble signals, second CSI of the downlink.

In some implementations, the pilot signals are received during a frame including preamble symbols followed by pilot symbols.

In some implementations, estimating the frequency offsets and phase offsets, comprises: applying, at the ground receiver system, a discrete Fourier transform (DFT) to the first CSI.

In some implementations, adjusting the preamble signals comprises: utilizing the frequency offsets and the phase offsets to remove, at the ground receiver system, a frequency offset and phase offset from each of the preamble signals.

In some implementations, adjusting the preamble signals, further comprises: applying a matched root-raised-cosine (RRC) filter to each of the preamble signals.

In some implementations, estimating, at the ground receiver system, the first CSI, comprises: obtaining, based on the second sequences of pilot symbols, a matrix $X_p[p]$ of MIMO-specific vectors of frame pilots, where $X_p[p]=[\underline{x}_{p,1}, \underline{x}_{p,2}, \ldots, \underline{x}_{p,M_s}]^T$, and $M_s$ is a number of the transmitters; representing, based on the first sequences of pilot symbols, a corresponding received matrix of pilots, $Y_p[p]$, as $Y_p[p]= H_p[p] \cdot X_p[p] + W_{d,p}[p]$, where $H_p[p]$ represents CSI for a pilot, is an index of the pth pilot, $p=1, 2, \ldots, N_p$, and $W_{d,p}[p]$ includes noise contributions for a pilot; and deriving, based on a least squares estimate, the first CSI as $\hat{H}_p[p]=Y_p[p] \cdot X_p[p] \cdot (X_p[p]X_p^H[p])^{-1}$.

In some implementations, the second CSI of the downlink between an $m_g$th gateway and $m_s$th satellite transmission is given by $$\hat{H}_{d,overall}|_{m_g,m_s} = \frac{\underline{x}_{amb,m_s}^H \cdot \underline{\tilde{y}}_{m_g,m_s}}{\underline{x}_{amb,m_s}^H \cdot \underline{x}_{amb,m_s}},$$

here $\underline{x}_{amb,m_s}$ is the vector of symbols from a preamble orthogonal Walsh-Hadamard (WH) sequence specific to an $m_s$th satellite transmission, and $\underline{\tilde{y}}_{m_g,m_s}$ represents a collection of a receive vector, associated with the downlink between the $m_g$th gateway and $m_s$th satellite transmission, across time samples of the preamble.

In some implementations, the method further comprises: determining, at the ground receiver system, using the second CSI of the downlink, a post-interference term; and applying, at the ground receiver system, the post-interference term to extracted receive symbols to compensate for inter-antenna interference at antennas of the receivers of the gateways.

In one embodiment, a ground receiver system, comprises: one or more processors; and one or more non-transitory computer-readable storage mediums storing instructions that, when executed by the one or more processors, cause the ground receiver system to perform the foregoing operations.

In one embodiment, a ground receiver system, comprises: one or more processors; and one or more non-transitory computer-readable storage mediums storing instructions that, when executed by the one or more processors, cause the ground receiver system to perform operations comprising: receiving, by multiple antennas of multiple gateways of the ground receiver system, from multiple transmitters of a satellite over a downlink of a line-of-sight LoS MIMO feeder link, multiple radio RF signals, each RF signal received at a respective one of the antennas; downconverting each of the RF signals; after downconverting each of the RF signals, sampling each of the RF signals to generate digital signals including sampled sequences of received symbols; suppressing frequency selective inphase/quadrature (I/Q) imbalance present in each of the sampled sequences of received symbols; suppressing inter-antenna MIMO interference present in the sampled sequences of received symbols; applying a receive filtering function to each of the sampled sequences of received symbols; and equalizing each of the sampled sequences of received symbols to compensate for inter-symbol interference (ISI).

In some implementations, the operation of suppressing the inter-antenna MIMO interference present in the sampled sequences of received symbols is applied after the operation of suppressing frequency selective I/Q imbalance present in each of the sampled sequences of received symbols.

In some implementations, suppressing the inter-antenna MIMO interference present in the sampled sequences of received symbols, comprises: applying a ground-based post interference processing matrix to the sampled sequences of symbols.

In some implementations, the ground-based post interference processing matrix is given by $G_{post}^{(n)} = \hat{\Theta}_{Tx}^{-1}[k] \cdot (\hat{H}_{d,overall})_{left}^{-1} \cdot \hat{\Theta}_{Rx}^{-1}[k]$, where $\hat{H}_{d,overall}$ is a downlink channel matrix, and $\hat{\Theta}_{Rx}[k]$, $\hat{\Theta}_{Tx}[k]$ are diagonal matrices collecting frequency and phase offset estimates.

In some implementations, the operation of equalizing each of the sampled sequences of received symbols is applied after the operation of suppressing the inter-antenna MIMO interference present in the sampled sequences of received symbols.

In one embodiment, a method comprises: receiving, at a ground receiver system, from a satellite, first sequences of pilot symbols and sequences of preamble symbols obtained by the satellite from RF signals received by multiple receivers of the satellite from multiple transmitters of multiple gateways of the ground receiver system over an uplink of a LoS MIMO feeder link, the first sequences of pilot symbols associated with second sequences of pilot symbols transmitted by the transmitters of the gateways; estimating, at the ground receiver system, based on the first sequences of pilot symbols and the second sequences of pilot symbols, first CSI of the pilot signals; estimating, at the ground receiver system, using the first CSI of the pilot signals, frequency offsets and phase offsets of links between the receivers and the transmitters; adjusting, at the ground receiver system, based at least on the frequency offsets and the phase offsets, the sequences of preamble symbols to obtain adjusted sequences of preamble symbols; and estimating, at the ground receiver system, using the adjusted sequences of preamble symbols, second CSI of the uplink. The second CSI of the uplink may be communicated from the ground receiver system to the satellite.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting the breadth, scope, or applicability thereof. It should be noted that for clarity and ease of illustration these drawings are not necessarily made to scale.

FIG. 2 is a flow diagram illustrating an example method that may be implemented on an uplink of a MIMO feeder link of a multi-beam satellite communication system to maximize gains in signal-to-noise-ratio (SNR), spatial multiplexing, and spatial diversity for uplink data transmission, in accordance with some implementations of the disclosure.

FIG. 3 illustrates a pre-interference compensation and post-interference compensation respectively applied at the ground and space locations during transmission on a MIMO feeder uplink to maximize gains in SNR, spatial multiplexing, and spatial diversity, in accordance with some implementations of the disclosure.

FIG. 4 is a flow diagram illustrating an example method that may be implemented on a downlink of a MIMO feeder link of a multi-beam satellite communication system to maximize gains in SNR, spatial multiplexing, and spatial diversity for downlink data transmission, in accordance with some implementations of the disclosure.

FIG. 5 illustrates a pre-interference compensation and post-interference compensation respectively applied at the space and ground locations during transmission on a MIMO feeder downlink to maximize gains in SNR, spatial multiplexing, and spatial diversity, in accordance with some implementations of the disclosure.

FIG. 6 is a flow diagram illustrating an example method that may be implemented in multi-beam satellite communication system to estimate the CSI of a LoS MIMO downlink, in accordance with some implementations of the disclosure.

The FIGURES are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In implementing ultra high-throughput satellite systems that support high data rates (e.g., to allow transmissions on the order of terabits-per-second), the design of LoS MIMO satellite feeder links is an important consideration. To this end, implementations of the disclosure relate to a MIMO-enabled multibeam satellite system that may achieve spatial orthogonality of independent signals transmitted in LoS channels, where these signals may use the same time, frequency, and/or polarization resources. This may be done while essentially using a common spot beam. To realize these advantages, the disclosure describes techniques, in the form of linear pre-interference and post-interference signal processing, that are designed to maximize gains in SNR, spatial multiplexing, and spatial diversity. Additionally, to realize LoS MIMO benefits in the multi-beam satellite system, the disclosure describes techniques for channel state information (CSI) acquisition to successfully extract a LoS MIMO channel matrix.

Further implementations of the disclosure describe a receiver architecture, suitable for a LoS MIMO feeder downlink as described herein. The receiver may implement the CSI estimation techniques described herein. Additionally, the receiver may be capable of addressing other significant practical impairments, such as frequency-selective I/Q imbalance, ISI, and/or multiple frequency offsets experienced at the transmit and receive sides.

Various advantages may be realized by implementing the systems and methods described herein. First, only a single satellite with multiple antennas may be needed to achieve spatial orthogonality of independent signals transmitted in LoS channels. Second, for a given geographic area, the systems and methods described herein may allow more gateways to be placed with acceptable interference levels among them. Further, for a given availability requirement, the systems and methods described herein may offer significantly enhanced overall satellite network availability against severe weather impairments relative to existing satellite network systems and methods, including those that utilize SISO feeder links. These and other advantages that may be realized by the disclosed systems and methods are further described below.

Figure 1A:
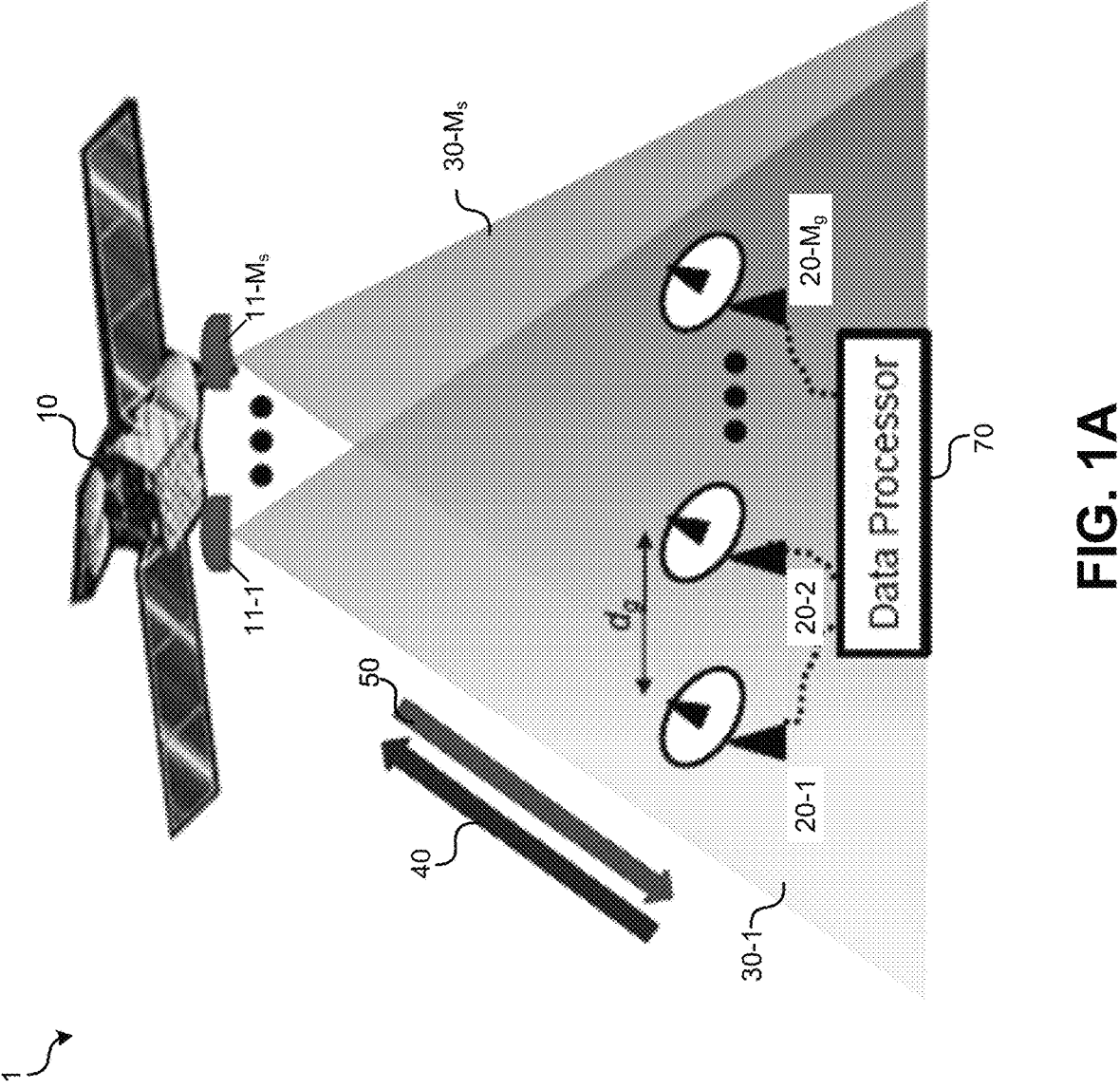
FIG. 1A depicts an individual MIMO-enabled feeder link in a multi-beam satellite communication system where the gateways are in a linear formation, in accordance with some implementations of the disclosure.

FIG. 1A depicts an individual MIMO-enabled feeder link in a multi-beam satellite communication system 1, in accordance with some implementations of the disclosure. The system includes satellite 10, which is a multi-beam satellite that communicates with gateways 20-1 to 20-M_g (individually referred to as a "gateway 20" and collectively referred to as "gateways 20") over a feeder link that carries data between gateways 20 and satellite 10. The feeder link includes uplink 40 for transmitting data from gateways 20 to satellite 10, and a downlink 50 for transmitting data from satellite 10 to gateways 20. The satellite 10 includes multi-feed reflector antennas 11-1 to 11-M_s (individually referred to as an "antenna 11" and collectively referred to as "antennas 11") that have high directivity, and which may be configured in a linear or circular pattern. Feeds in antennas 11 are used to radiate respective beams 30-1 to 30-M_s (individually referred to as a "beam 30" and collectively referred to as "beams 30") to the ground network. As depicted, the beams 30 highly overlap and are pointed toward the center of the multiplicity of gateways 20.

The ground network includes gateways 20 that may be configured as high capacity earth stations with connectivity to ground telecommunications infrastructure. The gateways 20 may include radio frequency terminals, each having an antenna that may send and receive signals to and from satellite 10. Additionally, the gateways may be configured to convert radio frequency (RF) signals to Internet Protocol (IP) signals for terrestrial connectivity. A network operations center (not shown) may be communicatively coupled to gateways 20 over a network and direct their operation. In this example, the gateways 20 are inter-connected terrestrially via one or more data processors 70 to facilitate their cooperation. As further described below, the gateways 20 may completely share the same time, frequency, and/or polarization resources. In the example of FIG. 1A, the gateways 20 are configured in a linear formation. In an alternative implementation, illustrated by FIG. 1B, the gateways 20 may be configured in a circular formation. In another alternative implementation, the satellite antennas may be configured in a circular formation.

Figure 1B:
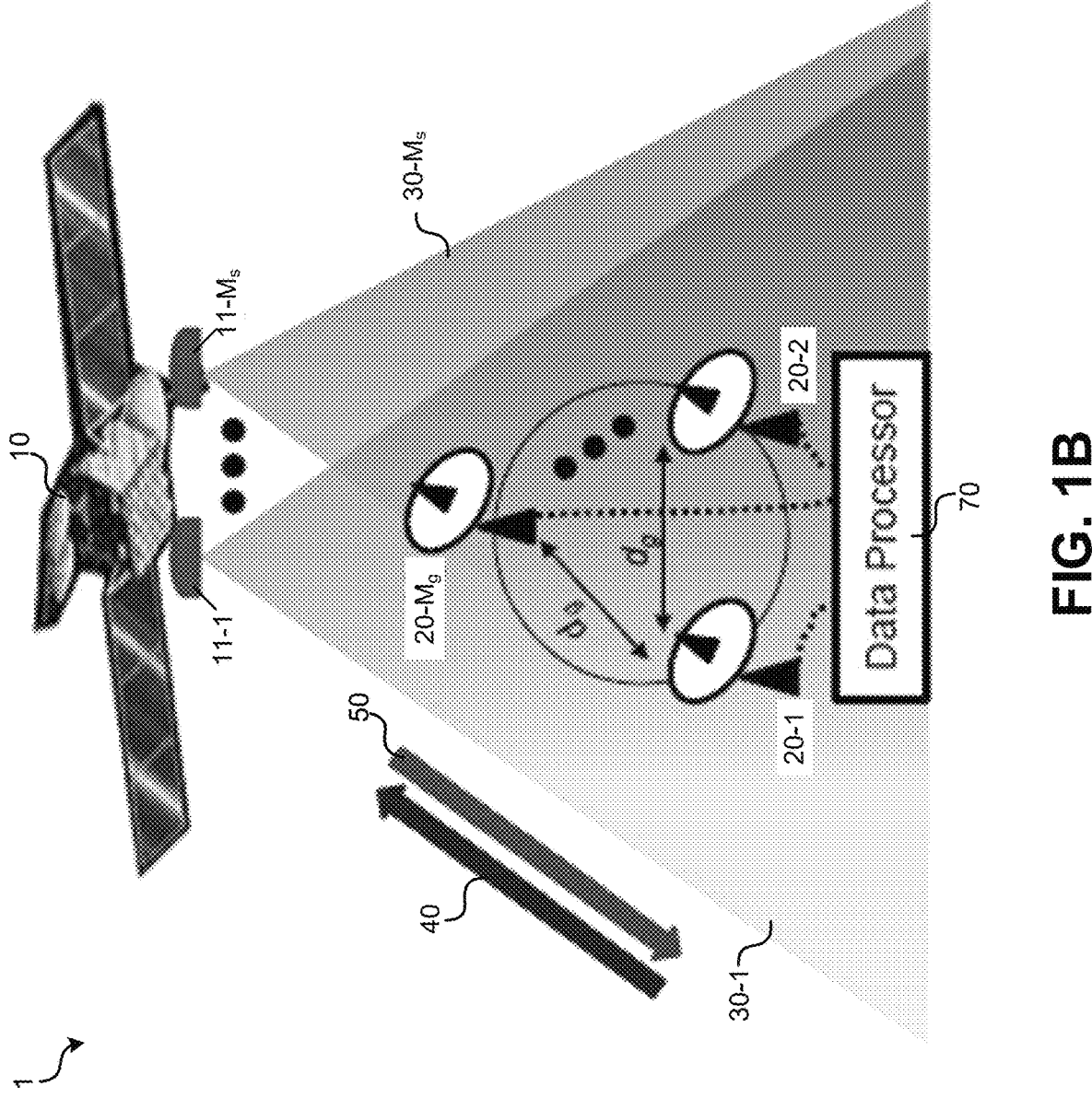
FIG. 1B depicts an individual MIMO-enabled feeder link in a multi-beam satellite communication system where the gateways are in a circular formation, in accordance with some implementations of the disclosure.

In this example, satellite communication system 1 is a geostationary Earth-orbiting (GEO) satellite system that benefits from LoS MIMO capability on the feeder link in both the uplink 40 and downlink 50 directions. Although an individual MIMO-enabled feeder link is depicted in FIGS. 1A-1B, there may be multiple such MIMO-enabled feeder links throughout a coverage area to provide massive overall satellite network throughput. The separation of the MIMO feeder links may be on the order of hundreds of kilometers or even greater to ensure no spatial interference among them. The extremely high frequency (EHF) range of the electromagnetic spectrum may be utilized in this communication system, including 47-52 GHz and 81-86 GHz for the feeder uplink 40 and 71-76 GHz on the feeder downlink 50.

An important consideration in designing the MIMO feeder link of satellite communication system 1 is accounting for interference induced by the MIMO feeder link. For example, on the uplink 40, interference may be induced by spatial interaction among the satellite receive antennas 11, the weather, and random noise in the system. On the downlink 50, interference may be induced by spatial interaction among the receive antennas of gateways 20, the weather, and random noise in the system. To this end, FIG. 2 is a flow diagram illustrating an example method 200 that may be implemented on an uplink 40 of the MIMO feeder link of multi-beam satellite communication system 1 to mitigate for interference induced during uplink data transmission. For ease of illustration, the steps of method 200 focus on data processing that is performed on the vector of symbols transmitted by the gateways 20. However, it should be appreciated that various intermediate steps may be performed at transmit or receive end of the uplink, including linear encoding and interleaving of data bits, bit-to-symbol modulation, applying a transmit or receive pulse-shaping filter, modulation of a waveform signal onto an appropriate carrier wave for transmission, downconversion, etc. FIG. 2 will be described with reference to FIG. 3, which corresponds to a particular mathematical implementation illustrating a pre-interference compensation and post-interference compensation respectively applied at the ground and space locations during transmission on the MIMO feeder uplink to mitigate for MIMO uplink interference depicted by the center box in FIG. 3.

Operation 202 includes generating, at a plurality of gateways communicatively coupled to a satellite over a LoS MIMO feeder link, a first vector of symbols to be transmitted to a satellite having a plurality of MIMO antennas. For example as depicted by FIG. 3, the gateways 20 may transmit a vector of symbols $\underline{x}_g^{(n)}$. To generate the first vector of symbols, each gateway 20 may perform functions such as obtaining information bits (e.g., information corresponding to text, images, audio, video, or other data) from a bit source, performing forward error correction by adding redundancy to the information data bits signal, optionally interleaving the encoded data bits by rearranging the bit sequence order, and using a bit-to-symbol modulator to form complex-valued data symbols from the bits. For example, the interleaved bits may be modulated using modulation schemes such as Amplitude Phase Shift Keying (APSK), Quadrature Phase Shift Keying (QPSK), $\pi$/M-MPSK, other orders of Multiple Phase Shift Keying MPSK, Quadrature Amplitude Modulation (QAM), and so on.

Operation 204 includes performing, at a data processor of the gateways, pre-interference signal processing on the first vector of symbols to generate a second vector of symbols, the pre-interference signal processing adjusting the first vector of symbols by a pre-interference term. For example as depicted by FIG. 3, a pre-interference term $G_{pre}^{(n)}$ may be applied to generate a second vector of symbols $\underline{\tilde{x}}_g^{(n)}$. The pre-interference term may be applied to ensure that a maximum power at each gateway is not exceeded.

In some implementations, operation 204 may be skipped (i.e., pre-interference signal processing is not performed on the first vector of symbols). In such implementations, operations 206-210 may be similarly performed, except with the original first vector of symbols rather than the pre-compensated first vector of symbols.

Operation 206 includes transmitting, over an uplink of the MIMO feeder link, using the plurality of gateways 20, the second vector of symbols. For example, the second vector of symbols may be converted into one or more waveform signals using one or more transmit pulse-shaping filters such as one or more root-raised-cosine (RRC) filters (e.g., one at each gateway), and the waveform signal(s) may be mixed with one or more carrier signal(s) for modulation on a carrier for transmission (e.g., by each gateway antenna).

Operation 208 includes receiving, using the plurality of MIMO antennas of the satellite, a third vector of symbols corresponding to a transformation of the second vector of symbols induced by transmission interference over the uplink of the MIMO feeder link. For example as depicted by FIG. 3, a third vector of symbols $\underline{y}_s^{(n)}$ is received due to transmission interference induced over the uplink. Transmission interference over the uplink of the MIMO feeder link may be caused by inter-antenna interference at the satellite receive antennas 11, weather/atmospheric conditions on the uplink, random noise, and/or other noise. To receive the third vector of symbols, the satellite 10 may perform, for each signal received at a satellite antenna, functions such as downconverting the received signal and applying, to the downconverted signal, a receive pulse-shaping filter corresponding to (i.e., matched to) a transmit pulse-shaping filter.

Operation 210 includes performing, at the satellite, post-interference signal processing on the third vector of symbols to generate a fourth vector of symbols, the post-interference signal processing adjusting the fourth vector of symbols by a post-interference term. For example as depicted by FIG. 3, a post-interference term $S_{post}^{(n)}$ may be applied to generate a fourth vector of symbols $\underline{\tilde{y}}_s^{(n)}$. In some implementations, post-interference signal processing may compensate for inter-antenna interference at the satellite receive antennas by taking into account the relative positioning of the satellite antennas, and estimating the interference based at least on the relative positioning of the satellite antennas. Post-interference signal processing may also account for weather/atmospheric conditions and random noise.

FIG. 4 is a flow diagram illustrating an example method 400 that may be implemented on a downlink 50 of the MIMO feeder link of multi-beam satellite communication system 1 to mitigate for interference induced during downlink data transmission. For ease of illustration, the steps of method 400 focus on data processing that is performed on the vector of symbols transmitted by the satellite 10. However, it should be appreciated that various intermediate steps may be performed at the transmit or receive end of the downlink, including linear encoding and interleaving of data bits, bit-to-symbol modulation, applying a transmit or receive pulse-shaping filter, modulation of a waveform signal onto an appropriate carrier wave for transmission, downconversion, etc. FIG. 4 will be described with reference to FIG. 5, which corresponds to a particular mathematical implementation illustrating a pre-interference compensation and post-interference compensation respectively applied at the space and ground locations during transmission on the MIMO feeder downlink to mitigate for MIMO downlink interference depicted by the center box in FIG. 5.

Operation 402 includes generating, at a satellite communicatively coupled to a plurality of gateways over a LoS MIMO feeder link, a first vector of symbols to be transmitted to the plurality of gateways. For example as depicted by FIG. 5, the satellite may transmit a vector of symbols $\underline{x}_s^{(n)}$.

Operation 404 includes performing, at the satellite, pre-interference signal processing on the first vector of symbols to generate a second vector of symbols, the pre-interference signal processing adjusting the first vector of symbols by a pre-interference term. For example as depicted by FIG. 5, a pre-interference term $S_{pre}^{(n)}$ may be applied to generate a second vector of symbols $\underline{\tilde{x}}_s^{(n)}$.

In some implementations, operation 404 may be skipped (i.e., pre-interference signal processing is not performed at the satellite on the first vector of symbols). In such implementations, operations 406-410 may be similarly performed, except with the original first vector of symbols rather than the pre-compensated first vector of symbols.

Operation 406 includes transmitting, over a downlink of the MIMO feeder link, using a plurality of MIMO antennas of the satellite, the second vector of symbols. For example, the second vector of symbols may be converted into a waveform signal using a transmit pulse-shaping filter such as a root-raised-cosine (RRC) filter, and the waveform signal may be mixed with a carrier signal to modulate it on a carrier for transmission.

Operation 408 includes receiving, at the plurality of gateways, a third vector of symbols corresponding to a transformation of the second vector of symbols induced by transmission interference over the downlink of the MIMO feeder link. For example as depicted by FIG. 3, a third vector of symbols $\underline{y}_g^{(n)}$ is received due to transmission interference induced over the downlink. Transmission interference over the downlink of the MIMO feeder link may be caused by inter-antenna interference at the gateways 20, weather/atmospheric conditions on the downlink, random noise, and/or other noise. To receive the third vector of symbols, each gateway 20 may perform functions such as downconverting a received signal and applying, to the downconverted signal, a receive pulse-shaping filter corresponding to (i.e., matched to) a transmit pulse-shaping filter.

Operation 410 includes performing, at a data processor of the gateways, post-interference signal processing on the third vector of symbols to generate a fourth vector of symbols, the post-interference signal processing adjusting the fourth vector of symbols by a post-interference term. For example as depicted by FIG. 5, a post-interference term $G_{post}^{(n)}$ may be applied to generate a fourth vector of symbols $\tilde{y}_g^{(n)}$. In some implementations, post-interference signal processing may compensate for inter-antenna interference at the gateway receive antennas by taking into account the relative positioning of the gateways, and estimating the interference based at least on the relative positioning of the gateways. Post-interference signal processing may also account for weather/atmospheric conditions and random noise.

As alluded to above, to account for interference induced by the MIMO feeder link, and develop techniques for CSI acquisition to extract a LoS MIMO channel matrix, an important consideration in satellite communication system 1 is the relative positioning of antennas 11 and the relative positioning of gateways 20. To this end, in one implementation the satellite communication system 1 may be mathematically modeled as follows. Letting the orbital location of the satellite 10 be on the equator with a longitudinal slot of $\theta_s$ and the satellite antennas 11 have a linear formation with uniform spacing of $d_s$, then the position vector, $\underline{a}_{s,m_s}$, of the $m_s$th antenna in a three-dimensional (3D) Cartesian coordinate system may be given by Equation (1):

$$\underline{a}_{s,m_s} = \begin{bmatrix} R_s \cdot \cos(\theta_s) - d_{s,ms} \cdot \sin(\theta_s) \\ R_s \cdot \sin(\theta_s) - d_{s,ms} \cdot \cos(\theta_s) \\ 0 \end{bmatrix} \tag{1}$$

where $R_s$ is the GEO radius and $d_{s,m_s}$ is the spacing between the center of the antenna array onboard the satellite and its $m_s$th antenna, or $$d_{s,m_s} = d_s \cdot \left( m_s - \frac{1}{2} - \frac{M_s}{2} \right)$$

with $m_s = 1, 2, \ldots, M_s$. Also in this example the satellite antenna array has a linear pattern, it should be noted that the satellite antenna array can also assume a circular pattern, increasing the number of trade-off combinations.

Continuing the foregoing mathematical model for the linear spacing pattern of the cluster of gateways as shown in FIG. 1A, the uniform spacing for the nth feeder link may be represented as $d_g^{(n)}$. The center of the gateway cluster has latitude and longitude coordinates of $\phi_g^{(n)}$ and $\theta_g^{(n)}$, respectively, whereas the orientation $\delta_g^{(n)}$ is the angle between the East-West direction and the gateway cluster. Then, the position vector, $\underline{a}_{g,m_g}^{(n)}$, of the $m_g$th gateway belonging to the nth feeder link in a 3D Cartesian coordinate system may be given by Equation (2):

$$\underline{a}_{g,m_g}^{(n)} = \begin{bmatrix} R_g\cos(\phi_g^{(n)})\cos(\theta_g^{(n)}) - d_{g,m_g}^{(n)}\left(\sin(\theta_g^{(n)})\cos(\delta_g^{(n)}) + \sin(\phi_g^{(n)})\cos(\theta_g^{(n)})\sin(\delta_g^{(n)})\right) \\ R_g\cos(\phi_g^{(n)})\sin(\theta_g^{(n)}) + d_{g,m_g}^{(n)}\left(\cos(\theta_g^{(n)})\cos(\delta_g^{(n)}) - \sin(\phi_g^{(n)})\sin(\theta_g^{(n)})\sin(\delta_g^{(n)})\right) \\ R_g\sin(\phi_g^{(n)}) + d_{g,m_g}^{(n)}\cos(\phi_g^{(n)})\sin(\delta_g^{(n)}) \end{bmatrix} \tag{2}$$

where $R_g$ is the Earth radius and $d_{g,m_g}^{(n)}$ is the spacing between the center of the gateway cluster and the $m_g$th gateway, or $$d_{g,m_g}^{(n)} = d_g^{(n)} \cdot \left( m_g - \frac{1}{2} - \frac{M_g}{2} \right)$$

with $m_g = 1, 2, \ldots, M_g$.

For the circular spacing pattern as shown in FIG. 1B, the gateways are equispaced with a separation of $d_g^{(n)}$ for the nth feeder link. Let $\phi_g^{(n)}$ and $\theta_g^{(n)}$ be the latitude and longitude of the center of the gateway formation on the Earth surface, respectively, whereas $\delta_g^{(n)}$ be the orientation corresponding to the angle between the East-West direction and a line connecting the first gateway to the array center. The position vector, $\underline{a}_{g,m_g}^{(n)}$, of the $m_g$th gateway belonging to the nth feeder link in a 3 D Cartesian coordinate system may be given by Equation (3):

$$\underline{a}_{g,m_g}^{(n)} = \begin{bmatrix} R_g\cos(\phi_g^{(n)})\cos(\theta_g^{(n)}) - \dfrac{d_g^{(n)}}{2\sin(\pi/M_g)}\left(\sin(\theta_g^{(n)})\cos(\delta_{g,m_g}^{(n)}) + \sin(\phi_g^{(n)})\cos(\theta_g^{(n)})\sin(\delta_{g,m_g}^{(n)})\right) \\ R_g\cos(\phi_g^{(n)})\sin(\theta_g^{(n)}) + \dfrac{d_g^{(n)}}{2\sin(\pi/M_g)}\left(\cos(\theta_g^{(n)})\cos(\delta_{g,m_g}^{(n)}) - \sin(\phi_g^{(n)})\sin(\theta_g^{(n)})\sin(\delta_{g,m_g}^{(n)})\right) \\ R_g\sin(\phi_g^{(n)}) + \dfrac{d_g^{(n)}}{2\sin(\pi/M_g)}\cos(\phi_g^{(n)})\sin(\delta_{g,m_g}^{(n)}) \end{bmatrix} \tag{3}$$

where $\delta_{g,m_g}^{(n)}$ is the orientation associated with the $m_g$th gateway, or $$\delta_{g,m_g}^{(n)} = \delta_g^{(n)} + \frac{2\pi}{M_g} \cdot (m_g - 1)$$

with $m_g=1, 2, \ldots, M_g$. Relative to the first gateway, linear formation provides linearly increasing gateway separation, whereas circular formation offers linearly increasing gateway orientation.

Referring now to the specific embodiment illustrated by FIGS. 3 and 5 for mitigating against MIMO inter-antenna interference and potentially other types of interference, to mitigate against MIMO inter-antenna interference, a MIMO channel model and capacity may be derived. A representation may be provided for the free-space channel response matrix $H_{u,LoS}^{(n)} \in \mathbb{C}^{M_s \times M_g}$ for the nth LoS MIMO-enabled feeder uplink; $n=1, 2, \ldots, N$. Under spherical wave propagation, its $(m_s, m_g)$th entry may be modeled as Equation (4):

$$H_{u,LoS}^{(n)}|_{m_s,m_g} = \frac{\lambda_u}{4\pi \cdot r_{m_s,m_g}} \cdot \exp\left(-j\frac{2\pi}{\lambda_u} \cdot r_{m_s,m_g}\right) \quad (4)$$

where $\lambda_u$ is the wavelength associated with the uplink carrier frequency and $r_{m_s,m_g}$ is the distance between the $m_g$th transmit gateway and the $m_s$th satellite antenna. In clear-sky conditions, the feeder uplink channel model may be made more complete to account for the radiation patterns of the satellite antennas, providing $\tilde{H}_u^{(n)}$ as Equation (5):

$$\tilde{H}_u^{(n)} = J_u \odot H_{u,LoS}^{(n)} \quad (5)$$

where $J_u$ has entries computed based on Equation (6):

$$g_u(\theta_o) =$$
$$\frac{1}{2} \cdot \frac{\lambda_u}{\pi D \cdot \sin(\theta_o)} \cdot J_1\left(\pi\frac{D}{\lambda_u} \cdot \sin(\theta_o)\right) + 36 \cdot \left(\frac{\lambda_u}{\pi D \cdot \sin(\theta_o)}\right)^3 \cdot J_3\left(\pi\frac{D}{\lambda_u} \cdot \sin(\theta_o)\right) \quad (6)$$

In Equation (6), $J_1(x)$ and $J_3(x)$ are the Bessel functions of the first and third order, respectively, $\theta_o$ represents the off-axis angle relative to boresight, and D is the diameter of the satellite antennas.

The uplink signal vector as received by the satellite antennas, $\underline{y}_s^{(n)}$, may be represented as:

$$\underline{y}_s^{(n)} = \tilde{H}_u^{(n)} \Lambda_u^{(n)} \cdot \underline{\tilde{x}}_g^{(n)} + \underline{w}_u^{(n)} \quad (7)$$

where $\underline{\tilde{x}}_g^{(n)}$ is the vector of symbols transmitted by the gateways, $\underline{w}_u^{(n)}$ is the additive white Gaussian noise (AWGN) uplink noise with variance $\sigma_u^2$, and $\Lambda_u^{(n)}$ is a diagonal matrix composed of atmosphere-induced complex-valued attenuations, $\xi_{m_g}^{(n)}$, affecting the gateways, or Equation (8):

$$\Lambda_u^{(n)} = \text{diag}\{\xi_1^{(n)}, \xi_2^{(n)}, \ldots, \xi_{M_g}^{(n)}\} \quad (8)$$

related to the rain attenuations $A_{m_g}^{(n)}$ in decibel (dB) as $A_{m_g}^{(n)} = -20 \cdot \log_{10}(|\xi_{m_g}^{(n)}|)$.

Based on the received uplink signal in (7), the time-invariant MIMO channel capacity may be given by Equation (9):

$$\mathcal{C}_u^{(n)} = \log_2(\det(I_{M_s} + \rho_u^{(n)} \cdot \tilde{H}_u^{(n)} \Lambda_u^{(n)} (\tilde{H}_u^{(n)} \Lambda_u^{(n)})^H)) \quad (9)$$

where $\rho_u^{(n)}$ is the carrier-to-noise ratio (CNR) on the uplink that includes the transmit power per gateway antenna (and not the sum transmit power).

Similar to Equation (5), an $M_g \times M_s$ feeder downlink channel matrix, $\tilde{H}_d^{(n)}$ can be defined based on the downlink wavelength $\lambda_d$ and the radiation patterns of the downlink beams $J_d$ as Equation (10):

$$\tilde{H}_d^{(n)} = H_{d,LoS}^{(n)} \odot J_d \quad (10)$$

The corresponding downlink signal vector may be given by Equation (11):

$$\underline{y}_g^{(n)} = \Lambda_d^{(n)} \tilde{H}_d^{(n)} \cdot \underline{\tilde{x}}_s^{(n)} + \underline{w}_d^{(n)} \quad (11)$$

where $\underline{\tilde{x}}_s^{(n)}$ is the vector of symbols transmitted by the satellite antennas and $\underline{w}_d^{(n)}$ is the AWGN downlink noise with variance $\alpha_d^2$. Its associated MIMO channel capacity is given by Equation (12):

$$\mathcal{C}_d^{(n)} = \log_2(\det(I_{M_g} + \rho_d^{(n)} \cdot (\Lambda_d^{(n)} \tilde{H}_d^{(n)})^H \Lambda_d^{(n)} \tilde{H}_d^{(n)})) \quad (12)$$

where $\rho_d^{(n)}$ is the downlink CNR. In (12), a property is applied that det $(I+AB)=\det(I+BA)$ if AB is complex conjugate symmetric.

As illustrated by FIG. 3, countermeasures against inter-antenna interference considered here for MIMO-enabled feeder links in the uplink direction may take the form of pre-interference, $G_{Pre}^{(n)}$, and post-interference, $S_{post}^{(n)}$, signal processing. Pre-interference processing may perform a linear combination of the gateway transmissions at the data processor through multiplication by $G_{pre}^{(n)}$ to provide a modified transmitted vector, $\underline{\tilde{x}}_g^{(n)}$, as Equation (13):

$$\underline{\tilde{x}}_g^{(n)} = G_{pre}^{(n)} \underline{x}_g^{(n)} \quad (13)$$

A normalization of $G_{pre}^{(n)}$ may be used to ensure that the maximum power $P_u^{(n)}$ at each gateway is not exceeded. A post-interference processing is needed to remove the spatial interaction among the satellite receive antennas induced, including when the gateways experience different weather/atmospheric conditions. This may be done by implementing a linear combination of the received signals onboard the satellite through multiplication by $S_{post}^{(n)}$ to provide a modified received vector, $\underline{\tilde{y}}_s^{(n)}$, as Equation (14):

$$\underline{\tilde{y}}_s^{(n)} = S_{post}^{(n)} \underline{y}_f^{(n)} \quad (14)$$

An optimal choice for $G_{pre}^{(n)}$ based on the peak-power constraint may be expressed as Equation (15):

$$G_{pre}^{(n)} = \sqrt{P_u^{(n)}} \cdot V_u^{(n)} Q \quad (15)$$

where $V_u^{(n)}$ is the matrix containing as columns the eigenvectors associated with $(\tilde{H}_u^{(n)})^H \tilde{H}_u^{(n)}$ and Q is the unitary discrete Fourier transform (DFT) matrix. The post-interference matrix may be derived under the zero-forcing (ZF) condition as the left-inverse of a cascade of matrices, or as shown by Equation (16):

$$S_{post}^{(n)} = \left(\tilde{H}_u^{(n)} \Lambda_u^{(n)} G_{pre}^{(n)}\right)_{left}^{-1} \quad (16)$$
$$= \left((G_{pre}^{(n)})^H (\tilde{H}_u^{(n)} \Lambda_u^{(n)})^H \tilde{H}_u^{(n)} \Lambda_u^{(n)} G_{pre}^{(n)}\right)^{-1} \cdot \left(\tilde{H}_u^{(n)} \Lambda_u^{(n)} G_{pre}^{(n)}\right)^H$$

The associated uplink signal-to-interference-and-noise ratio (SINR) may be the same across $m_g$ and computed as $$SINR_{u,m_g}^{(n)} = SINR_{u,clear}^{(n)} \cdot \left(\frac{1}{M_g}\sum_{i=1}^{M_g} 10^{(A_i^{(n)}/10)}\right)^{-1} \quad (17)$$

where $SINR_{u,clear}^{(n)}$ is the uplink SINR obtained under clear sky.

A special case, useful in heavy precipitation, may be applied when only post-interference processing is used, which can offer different SINR performance depending on rain attenuation $A_{m_g}^{(n)}$ that is affecting any individual gateway. This may be implemented by selecting a scaled identity matrix for pre-interference processing, $G_{pre}^{(n)} = \sqrt{P_u^{(n)}} \cdot I_{M_g}$ in

(13) and (16). The associated SINR performance for the case of implementing post-interference processing alone is given by Equation (18):

$$SINR_{u,m_g}^{(n)} = SINR_{u,clear,m_g}^{(n)} \cdot 10^{\left(-A_{m_g}^{(n)}/10\right)} \tag{18}$$

where $SINR_{u,clear,m_g}^{(n)}$ is the uplink SINR in clear sky associated with the $m_g$th gateway, possibly different under the post-processing solution, for $m_g=1, 2, \ldots, M_g$.

The achievable sum-rate for a given MIMO feeder link can then be determined for Gaussian symbols as Equation (19):

$$\mathcal{R}^{(n)} = \Sigma_{m_g=1}^{M_g} \log_2(1+SINR_{u,m_g}^{(n)}) \tag{19}$$

The design of countermeasures based on ZF criterion may achieve near-capacity performance as the noise levels are low on the feeder-link side. Other design criteria can also be implemented such as those based on minimum mean-square error (MMSE) or regularized ZF (RZF) to reduce amplification of noise components.

As illustrated by FIG. 5, countermeasures against inter-antenna interference considered here for MIMO-enabled feeder links in the downlink direction may take the form of pre-interference, $S_{pre}^{(n)}$, and post-interference, $G_{post}^{(n)}$, signal processing. Pre-interference processing may perform a linear combination of the satellite transmissions through multiplication by $S_{pre}^{(n)}$ to provide a modified transmitted vector, $\tilde{\underline{x}}_s^{(n)}$, as Equation (20):

$$\tilde{\underline{x}}_s^{(n)} = S_{pre}^{(n)} \cdot \underline{x}_s^{(n)} \tag{20}$$

A post-interference processing is needed to remove the spatial interaction among the gateway receive antennas induced, including when the gateways experience different weather/atmospheric conditions. This may be done by implementing a linear combination of the received gateway transmissions at the data processor through multiplication by $G_{post}^{(n)}$ to provide a modified received vector, $\tilde{\underline{y}}^{(n)}$, as Equation (21):

$$\tilde{\underline{y}}_g^{(n)} = G_{post}^{(n)} \cdot \underline{y}_g^{(n)} \tag{21}$$

The downlink counterpart to the pre-interference and post-interference processing in (15) and (16) may be presented by Equations (22)-(23):

$$S_{pre}^{(n)} = \sqrt{P_d^{(n)}} \cdot V_d^{(n)} Q \tag{22}$$

$$G_{post}^{(n)} = (\Lambda_d^{(n)} \tilde{H}_d^{(n)} S_{pre}^{(n)})_{left}^{-1} \tag{23}$$

Ground-Based CSI Acquisition for MIMO Feeder Links

In the LoS MIMO downlink 50 of the multi-beam satellite communication system 1, discussed above, multiple data streams may be spatially multiplexed over the transmit antennas 11 of the satellite 10 and received by the receiver antennas of gateways 20. Here, each receiver antenna may receive not only the direct signal intended for it, but also receive a fraction of signal from other propagation paths. Thus, it is important to estimate the CSI, which can also be referred to as a channel matrix, that specifies the channel properties of the MIMO communication link. CSI estimation may preferably be implemented on the ground to relieve the computational burden of the satellite 10 and conserve its computation power.

To this end, FIG. 6 is a flow diagram illustrating an example method 600 that may be implemented in multi-beam satellite communication system 1 to estimate the CSI or channel matrix of a LoS MIMO downlink 50, in accordance with some implementations of the disclosure. Method 600 may, for example, be implemented in gateways 20 and data processor 70. For example, based on the downlink transmissions by antennas 11 of satellite 10, a receiver of each gateway 20 may receive a respective MIMO signal and various signal processing operations may be performed at gateways 20 and/or processor 70 to derive the CSI on the downlink 50.

Figure 7:
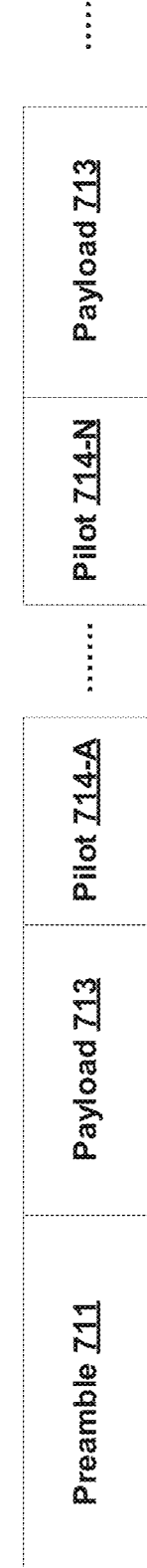
FIG. 7 is a diagram illustrating an example structure of a frame, in accordance with some implementations of the disclosure

In implementations of method 600, a frame container format may be used to manage communications. For example, FIG. 7 is a diagram illustrating an example structure of a frame 710, in accordance with some implementations of the disclosure. As depicted, the frame 710 may include the following fields: preamble 711, payload 713, and pilots 714A-714N interspersed between the payload 713. The number of symbols of each field, and the total symbol length of the frame 710 may vary. In a particular implementation, the preamble 711 may comprise 270 symbols. In implementations, having a long preamble and pilots 714 periodically repeated throughout the frame may be useful for CSI estimation. In particular implementations, the super-frame container format as specified in Annex E of the DVB-S2X standard may be used to manage communications.

Referring to method 600, operation 610 includes receiving, by multiple receivers of multiple gateways of a ground receiver system, from multiple transmitters of a satellite over a downlink of a LoS MIMO feeder link, multiple radio frequency (RF) signals. Operation 620 includes obtaining, at the ground receiver system, from the RF signals, preamble signals and pilot signals, the pilot signals including first sequences of pilot symbols associated with second sequences of pilot symbols transmitted by the transmitters An orthogonal sequence specific to each MIMO transmission may be used to ensure no pilot or preamble contamination after receiver processing.

Due to transmission interference over the downlink of the MIMO feeder link, the first sequences of pilot symbols may correspond to a transformation of the second sequences of pilot symbols. The transmission interference over the downlink of the MIMO feeder link may be caused by inter-antenna interference at the gateways 20, noise, and other factors. In some implementations, the pilot signals are received during a single frame including preamble symbols followed by pilot symbols.

Operation 630 includes estimating, at the ground receiver system, based on the first sequences of pilot symbols and the second sequences of pilot symbols, first CSI of the pilot signals. In order to estimate the first CSI of the pilot signals, it should be appreciated that pilot signals, sometimes referred to reference signals, may be reoccurring or periodic signals that are transmitted (e.g., using one or more RF carrier signals) by satellite antennas 11 to receivers of gateways 20 using well-defined transmit parameters such as amplitude. Each of the transmitted pilot signals may include a sequence or vector of symbols known in advance on both the transmit and receive sides. Using the well-defined transmit parameters and the pilot signals received at gateways 20, the CSI may be estimated for the pilots.

Operation 640 includes estimating, at the ground receiver system, using the first CSI of the pilot signals, frequency and phase offsets of links between the receivers and the transmitters. In some implementations, the frequency and phase offsets may be estimated by applying a DFT on the first CSI that was estimated.

Operation 650 includes adjusting, at the ground receiver system, based at least on the frequency and phase offsets, the preamble signals to obtain adjusted preamble signals. This may include utilizing the frequency and phase offsets to remove a frequency offset and phase offset from each of the preamble signals. In some implementations, after a frequency offset is removed from a preamble signal, a matched filter based on an RRC may applied to the preamble signal.

Operation 660 estimating, at the ground receiver system, using the adjusted preamble signals, CSI of the downlink.

Over time, method 600 may be iterated to update the CSI of the downlink. The time variation of the MIMO channel can be used to determine how often CSI is determined, which can span multiple frames.

In implementations, the estimated CSI of the downlink may be used to determine a post-interference term as described above with reference to FIGS. 4-5. For example, $G_{post}^{(n)}$ as indicated in Equation (23) may be determined using the estimated CSI of the downlink. Subsequently, at the ground receiver system, this post-interference term may be applied to extracted receive symbols to compensate for inter-antenna interference at the gateway receive antennas.

In particular mathematical implementations, algorithms for CSI acquisition to extract the LoS MIMO channel matrix in the presence of multiple frequency and phase offsets experienced at different antennas may be implemented as follows. The algorithms may rely on a frame format with two main features that include preamble and pilots, periodically repeated throughout a frame. The preamble and pilots are chosen based on orthogonal sequences, with a specific sequence selected per MIMO transmission ensuring no contamination. These frame features can be found in the superframe format specified in Annex E of the widely adopted DVB-S2X. The preamble and pilots may be chosen based on orthogonal Walsh-Hadamard (WH) sequences that have lengths of 256 and 32 symbols, respectively. To ensure no contamination, specific WH sequences may be selected per MIMO transmission.

In this mathematical implementation, a downlink MIMO signal model may be utilized that accounts for several practical impairments. The received MIMO signal, $$y_{m_g}\left(\frac{kT_s}{N_{ss}}\right),$$

at the $m_g$th gateway may be composed of superposition of waveforms, sampled at $N_{ss}$ samples per symbol, and mathematically expressed as Equation (24):

$$y_{m_g}\left(\frac{kT_s}{N_{ss}}\right) = \sum_{m_s=1}^{M_s} e^{j\left(2\pi\delta f_{R_x,m_g}\cdot\frac{kT_s}{N_{ss}}+\theta_{R_x,m_g}\right)} \cdot \tilde{H}_{d,overall}\bigg|_{m_g,m_s} \cdot$$
$$e^{j\left(2\pi\delta f_{T_x,m_s}\cdot\frac{kT_s}{N_{ss}}+\theta_{T_x,m_s}\right)} \cdot s_{m_s}\left(\frac{kT_s}{N_{ss}} - \tau\right) + w_{d,m_g}\left(\frac{kT_s}{N_{ss}}\right) \quad (24)$$

where $$s_{m_s}\left(\frac{kT_s}{N_{ss}}\right)$$

is the signal transmitted by the $m_s$th satellite antenna, $\tilde{H}_{d,overall}$ is the overall downlink MIMO channel matrix, including a pre-interference processing matrix if applied, and $$w_{d,m_g}\left(\frac{kT_s}{N_{ss}}\right)$$

is the sampled downlink Gaussian noise. In (24), $\delta f_{R_x,m_g}$ and $\delta f_{T_x,m_s}$ are the frequency offsets associated with the $m_g$th received gateway and $m_s$th transmitted satellite signals, respectively. Even though the satellite may be expected to have a single stable oscillator providing a common reference to the individual frequency converters, the parameter $\delta f_{T_x,m_s}$ represents a small, unavoidable offset that can be problematic in MIMO architecture if not addressed properly. Also, $\theta_{T_x,m_s}$, $\theta_{R_x,m_g}$ are the corresponding phase offsets and T is a common time drift.

A useful sample-level, stacked construction of (24), collecting the $M_g$ received gateway signals, may be represented as Equation (25):

$$\underline{y}[k] = \Theta_{Rx}[k] \cdot \tilde{H}_{d,overall} \Theta_{Tx}[k] \cdot \underline{s}[k] + \vec{w}_d[k] \quad (25)$$

and assumes that frame synchronization has been established. In (25), $$\underline{y}[k] = \left[y_1\left(\frac{kT_s}{N_{ss}}\right), y_2\left(\frac{kT_s}{N_{ss}}\right), \ldots, y_{M_g}\left(\frac{kT_s}{N_{ss}}\right)\right]^T$$

$$\underline{s}[k] = \left[s_1\left(\frac{kT_s}{N_{ss}}\right), s_2\left(\frac{kT_s}{N_{ss}}\right), \ldots, s_{M_s}\left(\frac{kT_s}{N_{ss}}\right)\right]^T$$

$$\underline{w}_d[k] = \left[w_{d,1}\left(\frac{kT_s}{N_{ss}}\right), w_{d,2}\left(\frac{kT_s}{N_{ss}}\right), \ldots, w_{d,M_g}\left(\frac{kT_s}{N_{ss}}\right)\right]^T$$

$$\Theta_{RX}[k] = \text{diag}$$
$$\left\{e^{j\left(2\pi\delta f_{R_x,1}\cdot\frac{kT_s}{N_{ss}}+\theta_{R_x,1}\right)}, e^{j\left(2\pi\delta f_{R_x,2}\cdot\frac{kT_s}{N_{ss}}+\theta_{R_x,2}\right)}, \ldots, e^{j\left(2\pi\delta f_{R_x,M_g}\cdot\frac{kT_s}{N_{ss}}+\theta_{R_x,M_g}\right)}\right\}$$

$$\Theta_{TX}[k] =$$
$$\text{diag}\left\{e^{j\left(2\pi\delta f_{T_x,1}\cdot\frac{kT_s}{N_{ss}}+\theta_{T_x,1}\right)}, e^{j\left(2\pi\delta f_{T_x,2}\cdot\frac{kT_s}{N_{ss}}+\theta_{T_x,2}\right)}, \ldots, e^{j\left(2\pi\delta f_{T_x,M_s}\cdot\frac{kT_s}{N_{ss}}+\theta_{T_x,M_s}\right)}\right\}$$

As suggested by (25), the tasks of obtaining MIMO CSI and multiple frequency and phase offsets require joint estimation. The tasks may be separated by first estimating the multiple frequency and phase offsets through applying DFT on the channel estimates during the pilots. Then, a least-squares solution of the channel estimate, $\hat{H}_{d,overall}$, may derived using the preamble, after utilizing the frequency and phase offset estimates to remove the detrimental impact of phase rotations.

For frequency and phase offset estimation, let $X_p[p]$ be a matrix collecting the MIMO-specific vectors of SFPs, $X_p[p]=[\underline{x}_{p,1}, \underline{x}_{p,2}, \ldots, \underline{x}_{p,M_s}]^T$. Then, the corresponding received matrix of pilots, $Y_p[p]$, may be expressed as Equation (26):

$$Y_p[p] = H_p[p] \cdot X_p[p] + W_{d,p}[p] \quad (26)$$

where $$H_p[p] = \Theta_{Rx}[k_p] \cdot \tilde{H}_{d,overall} \Theta_{Tx}[k_p], \quad (27)$$

$k_p$ is the index of the pth pilot, p=1, 2, . . . , $N_p$, and $W_{d,p}[p]$ has the noise contributions. A least-squares estimate may be used to derive the MIMO CSI of the pilots as Equation (28):

$$\hat{H}_p[p] = Y_p[p] \cdot X_p^H[p] \cdot (X_p[p]X_p^H[p])^{-1}. \quad (28)$$

When using orthogonal sequences, the modulation-removal operation used in (28), can be thought as producing samples of noisy complex-valued sinusoid in AWGN. The maximum-likelihood frequency estimator is the frequency that maximizes the magnitude of the DFT, efficiently computed using fast Fourier transform (FFT). Namely, the estimate of the composite frequency offset associated with the link between the $m_g$th gateway and $m_s$th satellite transmission, $\hat{\delta}f_{m_g,m_s}$, may be obtained by locating the DFT magnitude peak. Interpolation using the DFT peak and its adjacent neighbors can be used to further improve the frequency offset estimation. The corresponding phase offset estimate, $\hat{\theta}_{m_g,m_s}$, is the phase of the DFT peak.

For MIMO CSI estimation, a matched filter based on root-raised cosine (RRC), $P_{RRC}[n]$, may be used after removal of frequency offsets to ensure that the signal remains in-band, providing $\tilde{y}_{m_g,m_s}[n]$, associated with the link between the $m_g$th gateway and $m_s$th satellite transmission, as $$\tilde{y}_{m_g,m_s}[n] = p_{RRC}[k] * \left( y_{m_g}[k] \cdot e^{-j\left(2\pi\hat{\delta}f_{m_g,m_s}\cdot\frac{kT_s}{N_{ss}}+\hat{\theta}_{m_g,m_s}\right)} \right)\Bigg|_{k=nT_s} \quad (29)$$

Collecting the receive vector $\tilde{y}_{m_g,m_s}[n]$ across the time samples of a preamble, the least-squares estimate of the $(m_g, m_s)$th entry of $\hat{H}_{d,overall}$ is implemented according to $$\hat{H}_{d,overall}|_{m_g,m_s} = \frac{\underline{x}_{amb,m_s}^H \cdot \tilde{\underline{y}}_{m_g,m_s}}{\underline{x}_{amb,m_s}^H \cdot \underline{x}_{amb,m_s}} \quad (30)$$

where $\underline{x}_{amb,m_s}$ is the vector of symbols from the preamble orthogonal WH sequence specific to the $m_s$th satellite transmission.

As discussed above, estimation of the downlink channel may rely on transmission from the satellite of a frame format with a preamble and pilots. In some implementations, the aforementioned ground-based algorithms may also be used for the estimation of the uplink MIMO channel or CSI. However, the LoS MIMO satellite system may use frequency-division duplex (FDD), and not time-division duplex (TDD), requiring that the satellite be capable of extracting uplink pilots and preamble and then feeding them back to the gateways to be utilized at the ground-based data processor to estimate the uplink channel.

Figure 8:
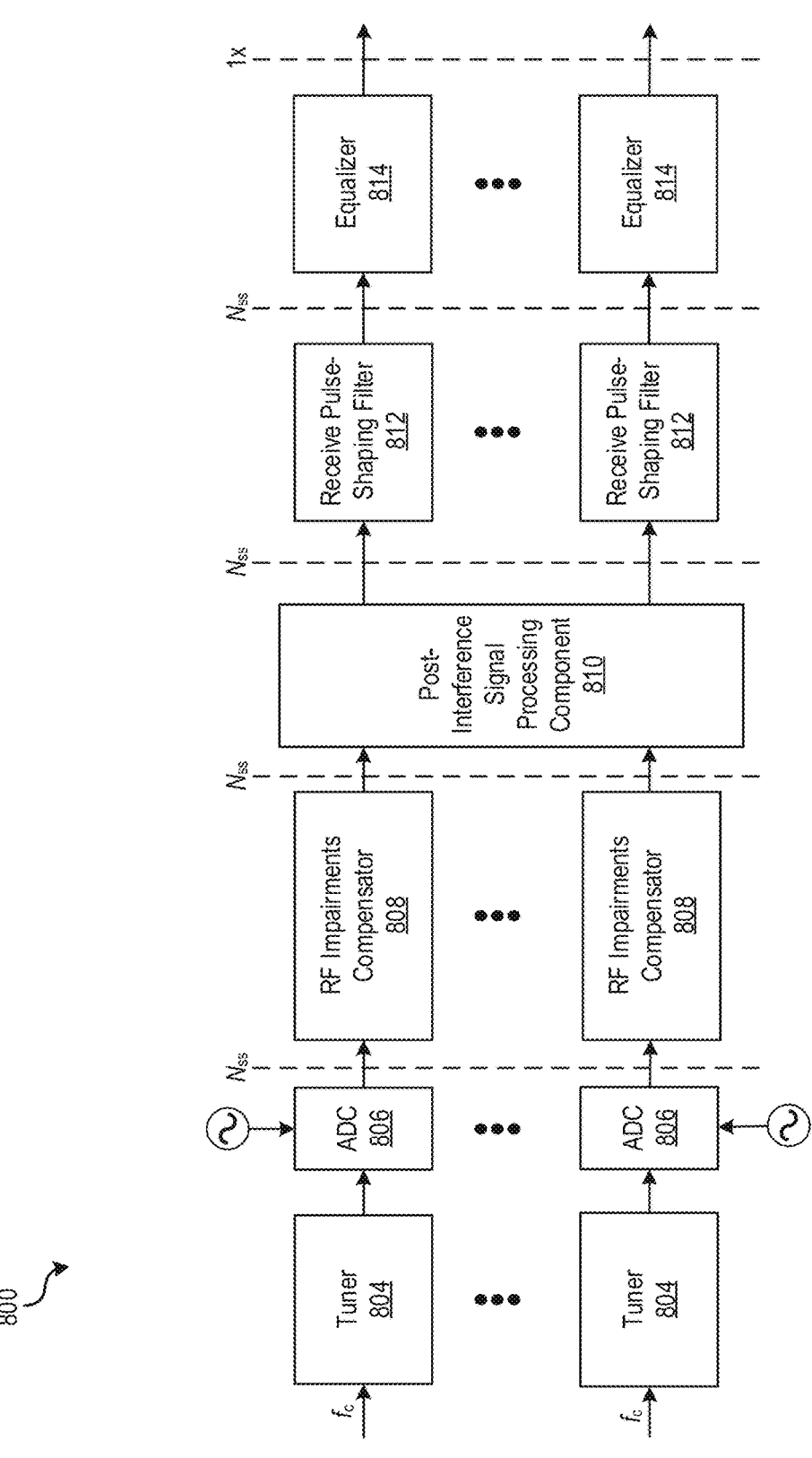
FIG. 8 is a block diagram illustrating an example LoS MIMO feeder downlink receiver structure for suppressing inter-antenna MIMO interference and correcting for signal impairments, in accordance with some implementations of the disclosure.
Figure 9A:
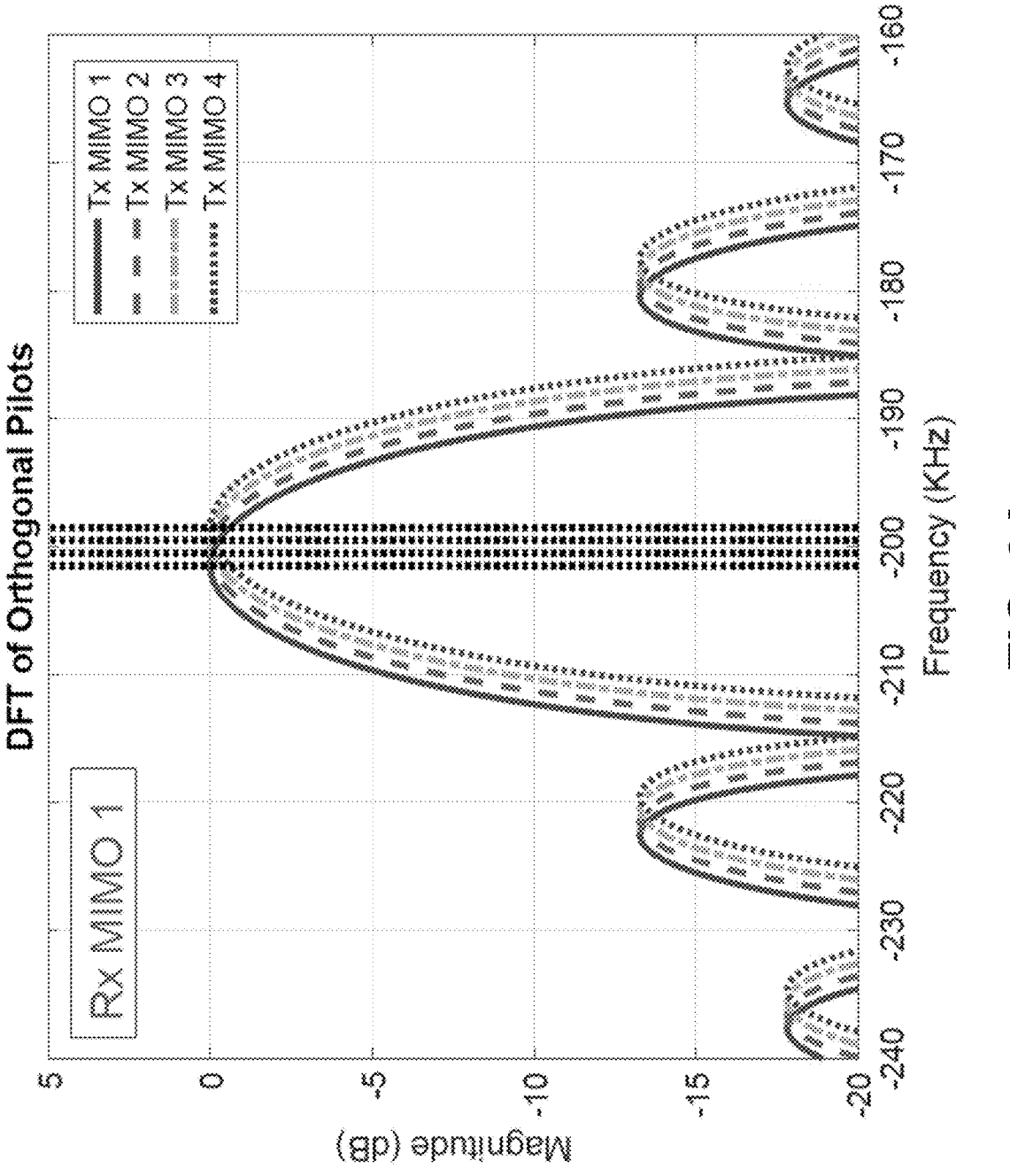
FIG. 9A depicts a discrete Fourier transform of orthogonal pilots for a 4×4 MIMO feeder downlink computed for Rx MIMO 1 centered at −200 KHz.
Figure 9B:
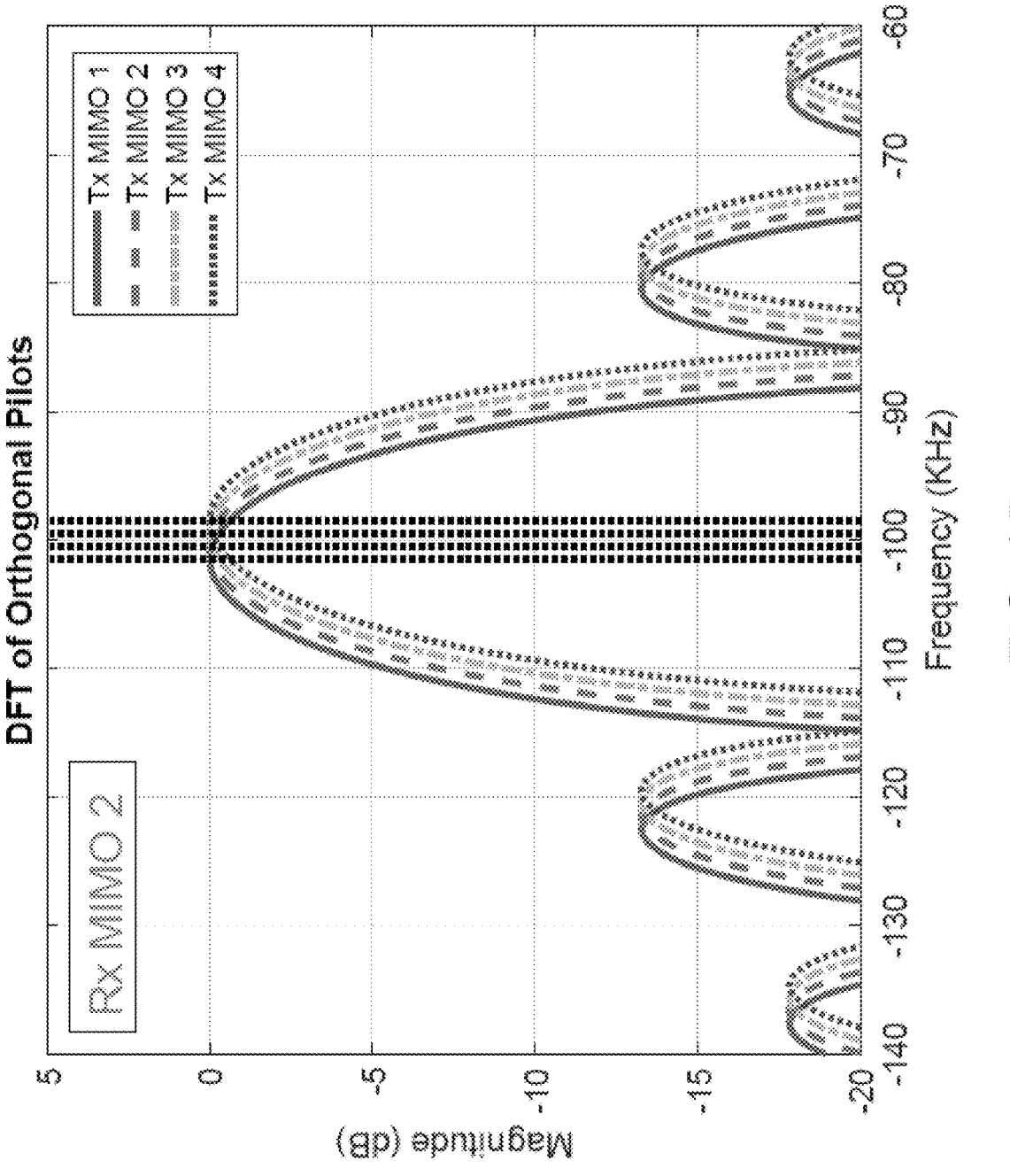
FIG. 9B depicts a discrete Fourier transform of orthogonal pilots for a 4×4 MIMO feeder downlink computed for Rx MIMO 2 centered at −100 KHz.
Figure 9C:
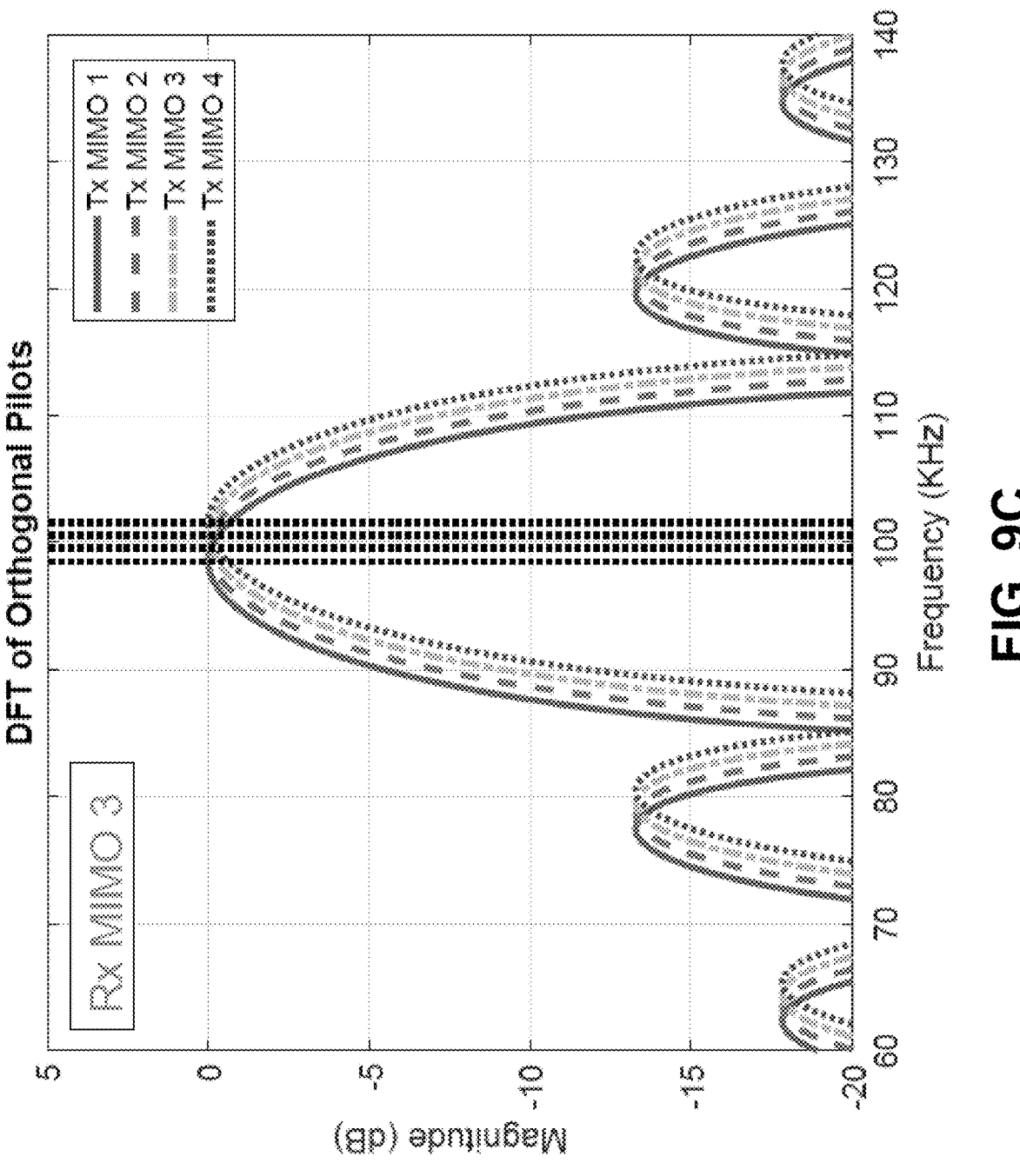
FIG. 9C depicts a discrete Fourier transform of orthogonal pilots for a 4×4 MIMO feeder downlink computed for Rx MIMO 3 centered at +100 KHz.
Figure 9D:
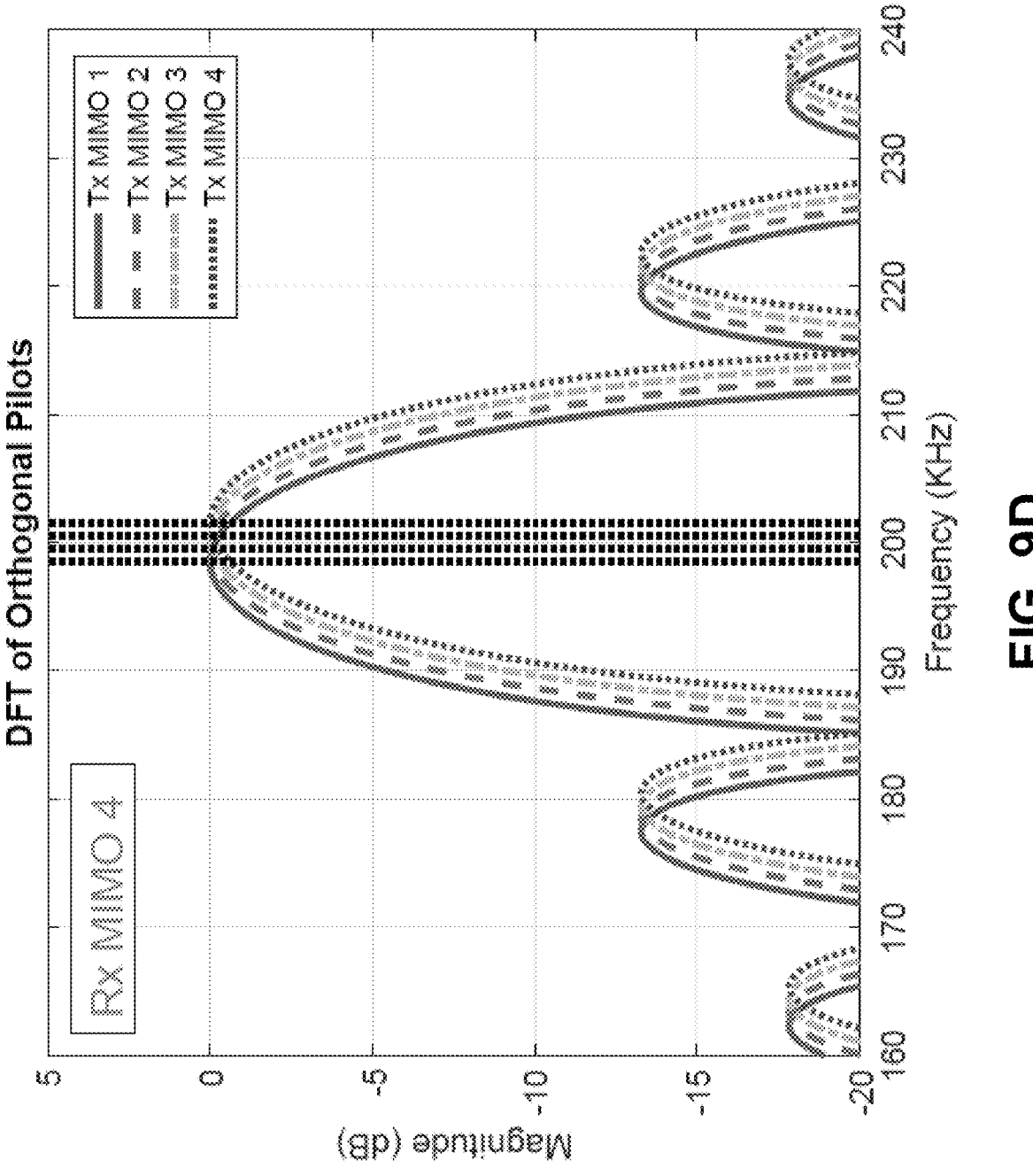
FIG. 9D depicts a discrete Fourier transform of orthogonal pilots for a 4×4 MIMO feeder downlink computed for Rx MIMO 4 centered at +200 KHz.

FIG. 8 is a block diagram illustrating an example LoS MIMO feeder downlink receiver structure 800 for suppressing inter-antenna MIMO interference and correcting for signal impairments, in accordance with some implementations of the disclosure. In addition to suppressing inter-antenna MIMO interference, the illustrated receiver structure 800 may be capable of tackling other significant practical impairments, such as frequency-selective I/Q imbalance, ISI, and multiple frequency offsets experienced at the transmit and receive sides. In particular implementations, the receiver structure 800 may implement the above-described DVB-S2X-enabled CSI estimation algorithms.

Receiver structure 800 may, for example, be implemented in gateways 20 and data processor 70. For example, based on the downlink transmissions by antennas 11 of satellite 10, a receiver of each gateway 20 may receive a respective MIMO signal $f_c$, and various signal and/or data processing operations may be performed at gateways 20 and/or processor 70. In this example, each gateway may include a tuner 804, an analog-to-digital converter (ADC) 806, RF impairments compensator 808, receive pulse-shaping filter 812, and equalizer 814. Such components may be implemented at a receiver of each gateway. Additionally, the gateways may utilize a post-interference signal processing component 810, which may be implemented via data processor 70 that facilitates cooperation of gateways 20. It should be noted that the various components of downlink receiver structure 800 may be implemented using hardware (e.g., circuitry), software, or some combination thereof. It should also be noted that for simplicity of illustration, some components of receiver structure 800 may be omitted from FIG. 8.

An RF signal received at a gateway 20 may be an analog signal comprising complex-valued symbols drawn from M-ary constellation, such as APSK. The received signal may be corrupted by inter-antenna interference, AWGN, and other sources of noise. The received signal may contain impairments such as ISI, phase and/or frequency offsets, and the like. Tuner 804 is configured to down convert the received RF signal by mixing the input waveform with a carrier down conversion signal from a local oscillator (not shown). In various implementations, tuner 804 may be implemented as a quadrature tuner that down converts a downlink signal to a lower intermediate frequency.

ADC 806 is configured to sample the downconverted analog signal to generate a digital signal including a sampled sequence of received symbols. In the example of FIG. 8, the output of ADC 806 is illustrated as having a sampling rate of multiple samples per symbol, Nss. A sampling rate of multiple samples per symbol may be maintained to avoid aliasing effects of ISI in the signal.

RF impairments compensator 808 is configured to suppress frequency selective I/Q imbalance present in the sampled sequence of received symbols. The imbalance may be strong and present at least in part because of tuner 804. The RF impairments compensator 808 may be implemented using a premixer equalizer with immunity to frequency offsets, which suppresses the distortion in a signal $\tilde{y}[n]$ and rejects its image $\tilde{y}^*[n]$ simultaneously. This may be achieved by applying coefficients $w_1[n]$ and $w_2[n]$ on each, respectively, followed by adding $\beta$ to remove direct-current (DC) offset as $$\tilde{z}[n]=(\tilde{y}[n]*w_1[n]+\tilde{y}^*[n]*w_2[n]+\beta) \quad (31)$$

In implementations, this may be achieved using the premixer equalizer from B. F. Beidas, "Radio-frequency impairments compensation in ultra high-throughput satellite systems," IEEE Trans. Commun., vol. 67, no. 9, pp. 6025-6038, September 2019, incorporated herein by reference in its entirety. Adaptive techniques may be utilized to obtain compensation coefficients in an iterative manner using stacked construction, while the pursued coefficients are independent of the frequency offset.

One advantage of implementing RF impairments compensator 808 before post interference signal processing component 810 is that the removal of frequency selective IQ imbalance prevents any negative interactions with the downlink channel matrix.

Post-interference signal processing component 810 is configured to suppress inter-antenna MIMO interference (i.e., remove spatial interference) present in the sampled sequence of received symbols. In various implementations, this may be achieved by applying a ground-based post interference processing matrix to the sampled sequence of received symbols obtained at each of the gateways. The ground-based post-interference processing matrix may be determined using the downlink channel matrix, which may be derived as described above with reference to method 600.

In a particular mathematical implementation, a ground-based post-interference processing matrix $G_{post}^{(n)}$ may be expressed as Equation (32):

$$G_{post}^{(n)} = \hat{\Theta}_{Tx}^{-1}[k] \cdot (\hat{H}_{d,overall})_{left}^{-1} \cdot \hat{\Theta}_{Rx}^{-1}[k] \tag{32}$$

where $\hat{H}_{d,overall}$ is obtained via (30), and $\hat{\Theta}_{Rx}[k]$, $\hat{\Theta}_{Tx}[k]$ are diagonal matrices collecting the frequency and phase offset estimates, determined from the DFT peaks, as $$\hat{\Theta}_{RX}[k] =$$

$$\mathrm{diag}\left\{ e^{j\left(2\pi\hat{\delta}f_{1,1} \cdot \frac{kT_x}{N_{ss}} + \hat{\theta}_{1,1}\right)}, \ e^{j\left(2\pi\hat{\delta}f_{2,1} \cdot \frac{kT_x}{N_{ss}} + \hat{\theta}_{2,1}\right)}, \ \ldots, \ e^{j\left(2\pi\hat{\delta}f_{M_g,1} \cdot \frac{kT_x}{N_{ss}} + \hat{\theta}_{M_g,1}\right)} \right\}$$

$$\hat{\Theta}_{TX}[k] =$$

$$\mathrm{diag}\left\{ 1, \ e^{j\left(2\pi\left(\hat{\delta}f_{1,2} - \hat{\delta}f_{1,1}\right)\frac{kT_x}{N_{ss}} + \hat{\theta}_{1,2} - \hat{\theta}_{1,1}\right)}, \ \ldots, \ e^{j\left(2\pi\left(\hat{\delta}f_{1,M_s} - \hat{\delta}f_{1,1}\right)\frac{kT_x}{N_{ss}} + \hat{\theta}_{1,M_2} - \hat{\theta}_{1,1}\right)} \right\}$$

Receive pulse-shaping filter 813 is configured to apply a receive filtering function to the sampled sequence of received symbols. The receive pulse-shaping filter 813 may be matched to a transmit filter. In a particular implementation, an RRC filter may be used.

Equalizer 814 is configured to process the sampled sequence of received symbols to remove linear distortion induced at the satellite (e.g., by the satellite filters) and/or compensate for ISI before presenting the outputs for forward-error correction (FEC) decoding. One advantage of implementing equalizer 814 after post interference signal processing component 810, as illustrated by FIG. 8, is that component 810 effectively separates the MIMO transmissions such that the equalizer can effectively counteract the linear distortion and compensate for ISI. In implementations, equalizer 814 may be a fractionally spaced (FS) equalizer.

In clear sky, ground-based, post-interference processing alone may be sufficient to minimize the MIMO inter-antenna interference while conserving satellite computational resources. However, under rainfall, a combined solution that involves onboard, pre-interference processing may bring about improved performance. As described in this disclosure, this may require the knowledge of the rain attenuations which can be obtained at the gateway and transferred to the satellite. To overcome latency associated with the satellite propagation delay, it may be necessary to provide accurate rain fade forecasting for the application of pre-interference processing. In this regard, architectures for near-term and long-term prediction, can be employed at the gateway. Moreover, rain fade forecasting achieves another important purpose in practice which is maintaining seamless service, resulting from proactively managing the switch-over events between primary and diversity gateways. Also, the signal propagation delay induces differential phase shift among the MIMO channel coefficients when applied for pre-interference processing. Due to its predictable behavior over time, this differential phase shift can be pre-compensated accurately by tracking the satellite's motion within its station-keeping box.

Simulations were conducted to demonstrate the effectiveness of a MIMO downlink receiver developed in accordance with the disclosure (e.g., a receiver structure as described with reference to FIG. 8) that employs MODCODs defined in the DVB-S2X standard including 64-ary amplitude, phase shift-keying (64APSK) signals. The transmit pulse shaping and its corresponding receive matched filtering used RRC filters with rolloff of 0.05. A 4×4 MIMO feeder downlink was examined based on using a carrier frequency of 70 GHz and gateway cluster placed in Nevada with a circular formation maintaining an adjacent separation of 22 km. The corresponding 4×4 MIMO channel was assumed not available to the receiver structure apriori, but was obtained using the CSI estimation algorithms described above. The preamble and pilots are chosen based om orthogonal Walsh-Hadamard (WH) sequences that have lengths of 256 and 32 symbols, respectively. On the receiver side, a wideband quadrature frequency-converter, or tuner, was implemented with bandwidth spanning 1 GHz. The anti-aliasing filters were designed using sixth-order Butterworth criterion with singlesided cutoff frequency of 500 MHz. In addition, mismatch in gain and phase of 15% and 10°, respectively, were used at the LO mixer. DC offset parameters were chosen as 0.05 and −0.05 on the inphase and quadrature arms, respectively. The sampling rate at the analog-to-digital converter (ADC) outputs were 2 Giga samples per second.

The evaluation setup implemented the system model described above with a GEO satellite in an equatorial slot with longitude $\theta_s$ of 97° W and orbital radius $R_d$ of 42,164 km. The reflector antennas used radiation patterns that followed Equation (6) with diameter D=2 meters, and were uniformly spaced by $d_s$=6 meters.

FIGS. 9A-9D show the DFT outputs for each gateway in a 4×4 MIMO feeder downlink when using orthogonal WH pilots. Used is an exemplary set of received frequency offsets of [−200, −100, +100, +200], in KHz, at gateway one through four, respectively. Also, a small frequency offset of [−1.5, −0.5, +0.5, +1.5], in KHz, is assumed present at transmit antenna one through four, respectively. As evident in FIGS. 9A-9D, the locations of the DFT peaks match the corresponding desired frequency offsets with high accuracy, despite the strong MIMO inter-antenna interference. The obtained frequency and phase estimates were then used to form $G_{post}^{(n)}$ in Equation (32) that is used in FIGS. 10A-10D below.

Figure 10A:
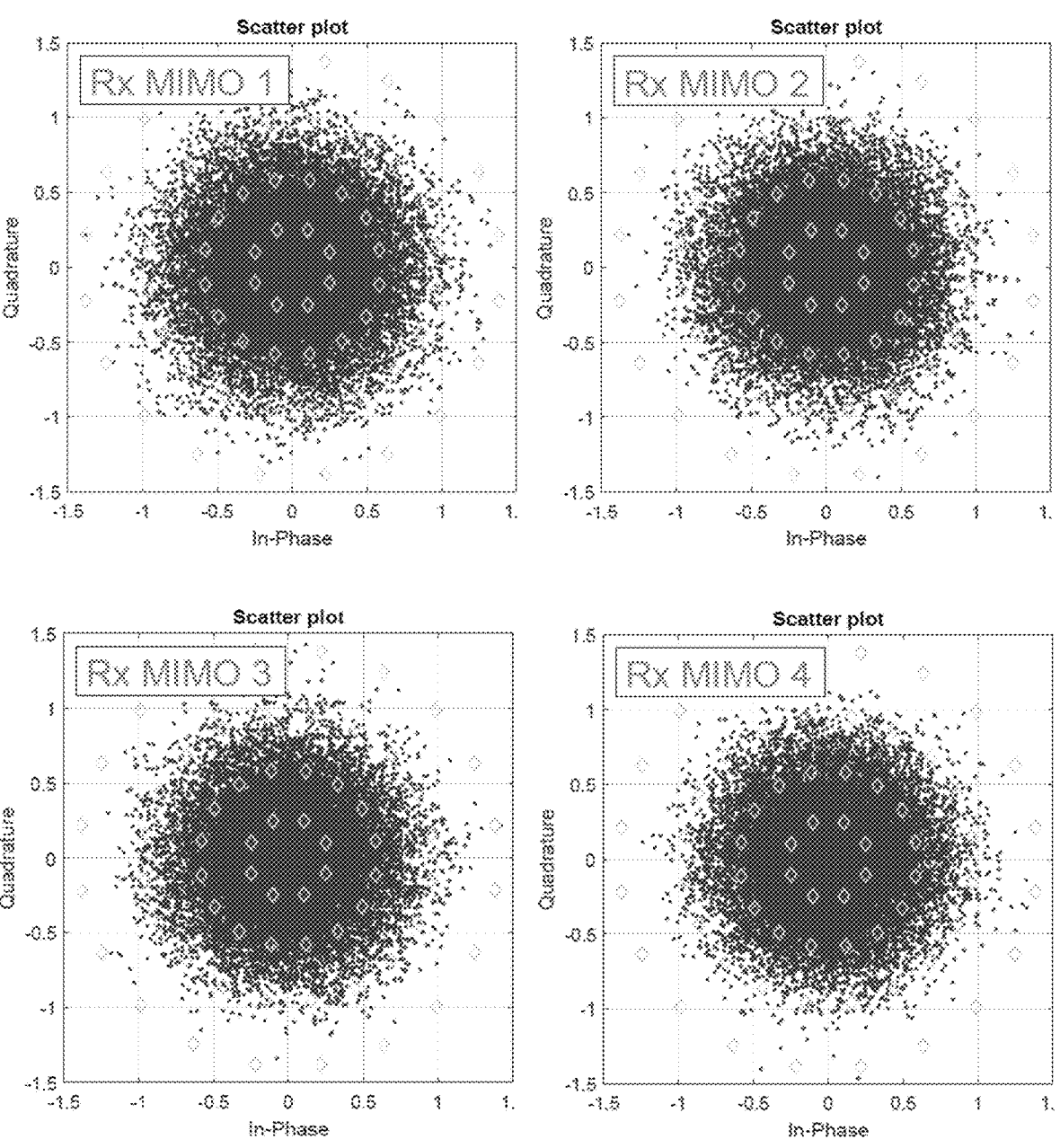
FIG. 10A depicts noiseless scatter plots at the output of 41-tap FS equalizers for 4×4 MIMO feeder downlink carrying 64APSK at 70 GHz with circular gateway formation using adjacent separation of 22 km without inter-antenna interference suppression.
Figure 10B:
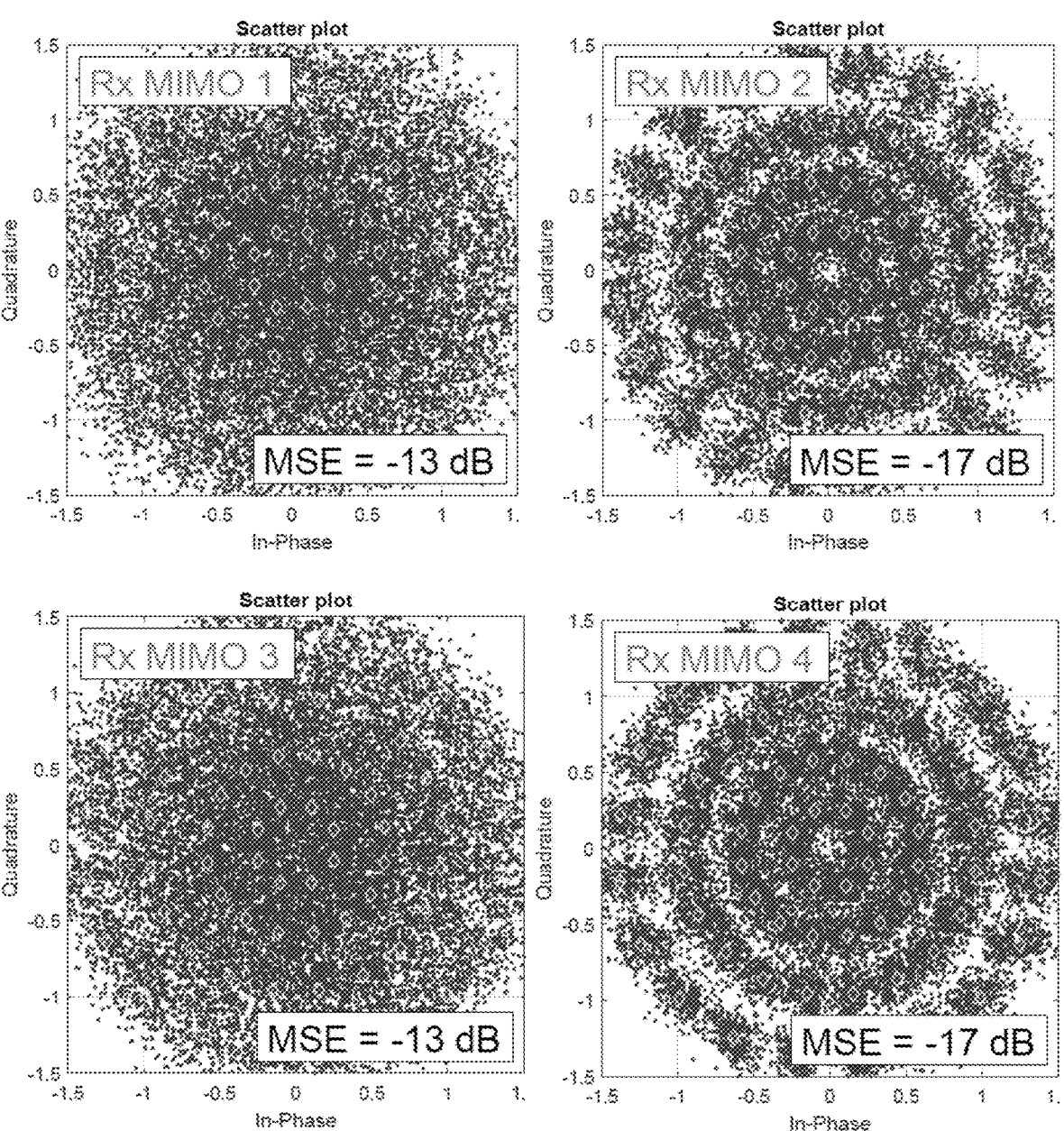
FIG. 10B depicts noiseless scatter plots at the output of 41-tap FS equalizers for 4×4 MIMO feeder downlink carrying 64APSK at 70 GHz with circular gateway formation using adjacent separation of 22 km without I/Q imbalance compensation.
Figure 10C:
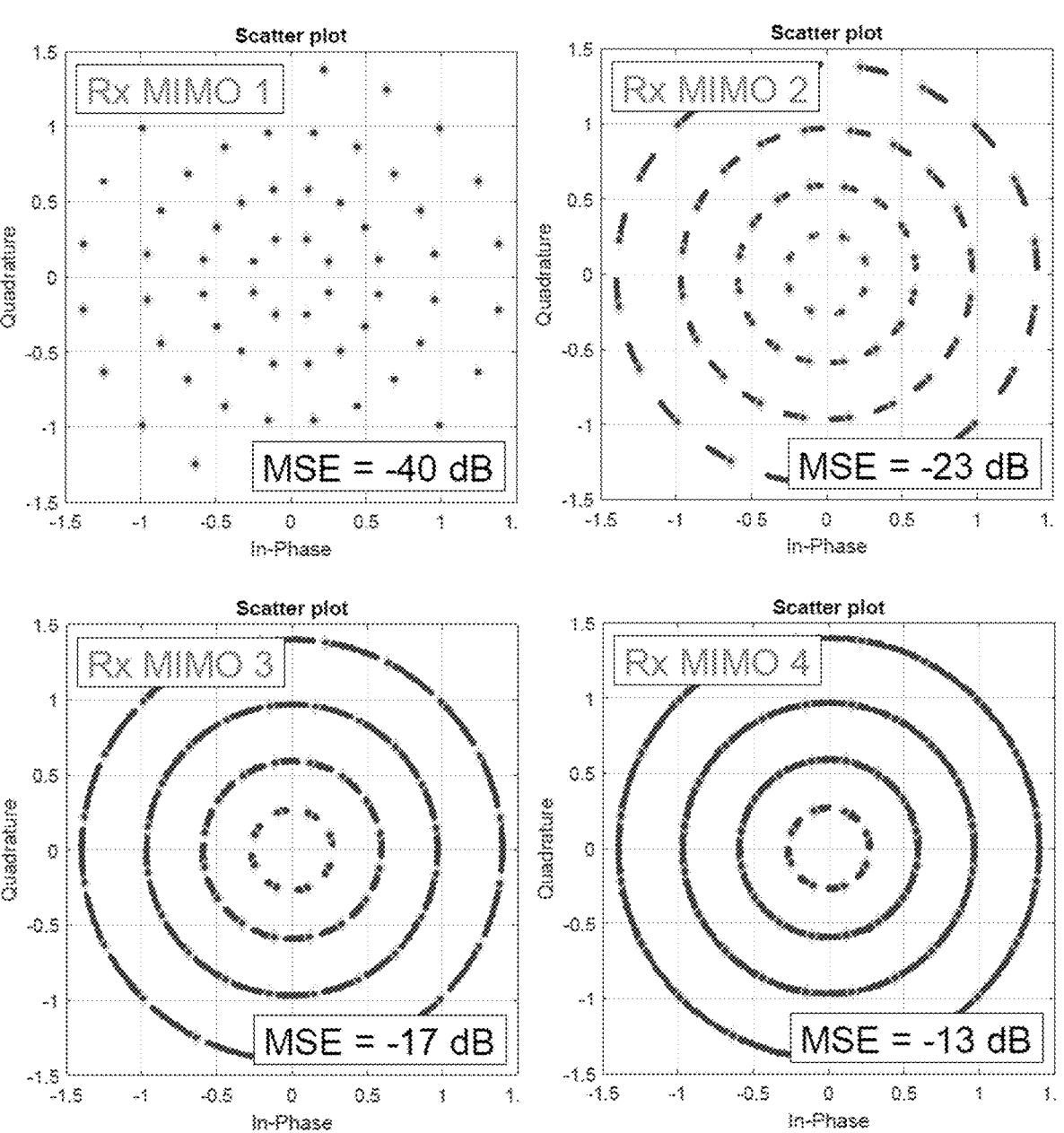
FIG. 10C depicts noiseless scatter plots at the output of 41-tap FS equalizers for 4×4 MIMO feeder downlink carrying 64APSK at 70 GHz with circular gateway formation using adjacent separation of 22 km without Tx frequency offset compensation.
Figure 10D:
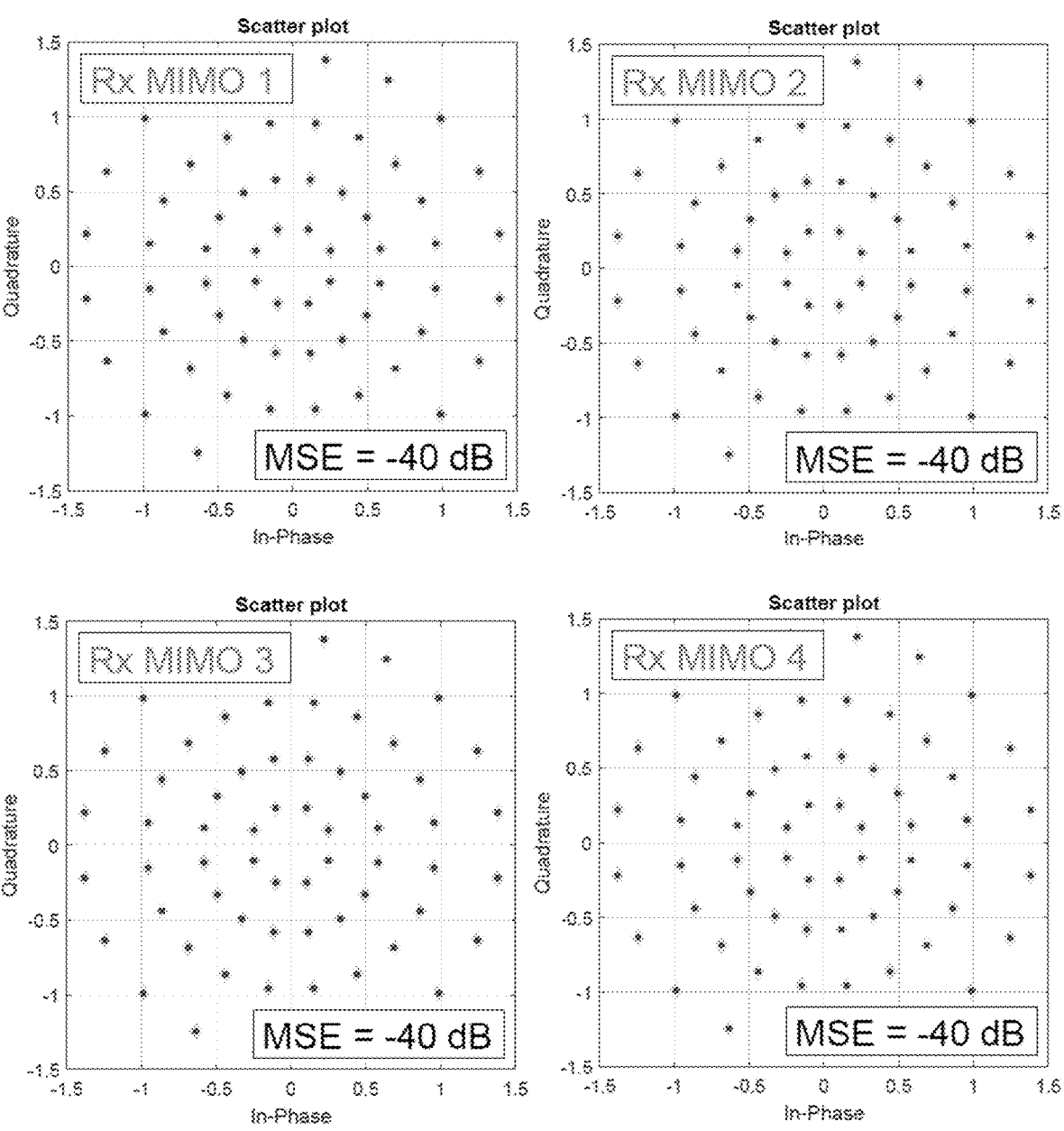
FIG. 10D depicts noiseless scatter plots at the output of 41-tap FS equalizers for 4×4 MIMO feeder downlink carrying 64APSK at 70 GHz with circular gateway formation using adjacent separation of 22 km with all modules activated.

FIGS. 10A-10D are noiseless scatter plots at the output of 41-tap FS equalizers for 4×4 MIMO feeder downlink carrying 64APSK at 70 GHz with circular gateway formation using adjacent separation of 22 km. These plots depict the improvement in signal quality for the four transmissions in a 4×4 MIMO feeder. Without suppressing the inter-antenna MIMO interference, a significant amount of clustering was seen in FIG. 10A. This is indicative of the overwhelming interference present when the four MIMO transmissions completely share the same time, frequency, and polarization resources. Not compensating for the strong frequency selective I/Q imbalance in FIG. 10B resulted in poor mean square-error (MSE) relative to the transmitted 64 APSK signals that imposed a substantial penalty on the decoder performance, resulting in a loss of spectral efficiency. FIG. 10C depicts the error floor that results from leaving any transmit-side frequency offset uncompensated. In contrast, as depicted by FIG. 10D, the developed receiver structure very successfully mitigated all the strong practical impairments and offered removal of the clustering with an MSE of −40 dB for all four MIMO transmissions.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising: receiving, by multiple receivers of multiple gateways of a ground receiver system, from multiple transmitters of a satellite over a downlink of a line-of-sight (LoS) multiple-input multiple-output (MIMO) feeder link, multiple radio frequency (RF) signals;
   obtaining, at the ground receiver system, from the RF signals, preamble signals and pilot signals, the pilot signals including first sequences of pilot symbols associated with second sequences of pilot symbols transmitted by the transmitters;
   estimating, at the ground receiver system, based on the first sequences of pilot symbols and the second sequences of pilot symbols, first channel state information (CSI) of the pilot signals;
   estimating, at the ground receiver system, using the first CSI of the pilot signals, frequency offsets and phase offsets of links between the receivers and the transmitters;
   adjusting, at the ground receiver system, based at least on the frequency offsets and the phase offsets, the preamble signals to obtain adjusted preamble signals;
   estimating, at the ground receiver system, using the adjusted preamble signals, second CSI of the downlink; and
   wherein the first sequences of pilot symbols correspond to a transformation of the second sequences of pilot symbols induced by transmission interference over the downlink of the LoS MIMO feeder link.

2. The method of claim 1, wherein the pilot signals are received during a frame including preamble symbols followed by pilot symbols.

3. The method of claim 1, wherein estimating the frequency offsets and phase offsets, comprises: applying, at the ground receiver system, a discrete Fourier transform (DFT) to the first CSI.

4. The method of claim 1, wherein adjusting the preamble signals comprises: utilizing the frequency offsets and the phase offsets to remove, at the ground receiver system, a frequency offset and phase offset from each of the preamble signals.

5. The method of claim 4, wherein adjusting the preamble signals, further comprises: applying a matched root-raised-cosine (RRC) filter to each of the preamble signals.

6. The method of claim 5, wherein estimating, at the ground receiver system, the first CSI, comprises:
   obtaining, based on the second sequences of pilot symbols, a matrix $X_p[p]$ of MIMO-specific vectors of frame pilots, where $X_p[p]=[\underline{x}_{p,1},\underline{x}_{p,2}, \ldots ,X_p, M_s]^T$, and $M_s$ is a number of the transmitters;
   representing, based on the first sequences of pilot symbols, a corresponding received matrix of pilots, $Y_p[p]$, as $Y_p[p]=H_p[p]\cdot X_p[p]+W_{d,p}[p]$, where $H_p[p]$ represents CSI for a pilot, is an index of the pth pilot, p=1,2, \ldots , $N_p$, and $W_{d,p}[p]$ includes noise contributions for a pilot; and
   deriving, based on a least squares estimate, the first CSI as $$\hat{H}_p[p]=Y_p[p]\cdot X_p^H[p]\cdot (X_p[p]X_p^H[p])^{-1}.$$

7. The method of claim 5, wherein the second CSI of the downlink between an $m_g$th gateway and $m_s$th satellite transmission is given by $$\hat{H}_{d,overall}|_{m_g,m_s} = \frac{\underline{x}_{amb,m_s}^H \cdot \underline{\tilde{y}}_{m_g,m_s}}{\underline{x}_{amb,m_s}^H \cdot \underline{x}_{amb,m_s}},$$

where $x_{amb,ms}$ is the vector of symbols from a preamble orthogonal Walsh-Hadamard (WH) sequence specific to an $m_s$th satellite transmission, and $y\_\tilde{}_{mg,ms}$ represents a collection of a receive vector, associated with the downlink between the $m_g$th gateway and $m_s$th satellite transmission, across time samples of the preamble.

8. The method of claim 1, further comprising:
determining, at the ground receiver system, using the second CSI of the downlink, a post-interference term; and
applying, at the ground receiver system, the post-interference term to extracted receive symbols to compensate for inter-antenna interference at antennas of the receivers of the gateways.

9. A ground receiver system, comprising:
one or more processors; and
one or more non-transitory computer-readable storage mediums storing instructions that, when executed by the one or more processors, cause the ground receiver system to perform operations comprising:
receiving, by multiple receivers of multiple gateways of the ground receiver system, from multiple transmitters of a satellite over a downlink of a line-of-sight (LoS) multiple-input multiple-output (MIMO) feeder link, multiple radio frequency (RF) signals;
obtaining, from the RF signals, preamble signals and pilot signals, the pilot signals including first sequences of pilot symbols associated with second sequences of pilot symbols transmitted by the transmitters;
estimating, based on the first sequences of pilot symbols and the second sequences of pilot symbols, first channel state information (CSI) of the pilot signals;
estimating, using the first CSI of the pilot signals, frequency offsets and phase offsets of links between the receivers and the transmitters;
adjusting, based at least on the frequency offsets and the phase offsets, the preamble signals to obtain adjusted preamble signals; and
estimating, using the adjusted preamble signals, second CSI of the downlink; and
wherein the first sequences of pilot symbols correspond to a transformation of the second sequences of pilot symbols induced by transmission interference over the downlink of the LoS MIMO feeder link.

10. The ground receiver system of claim 9, wherein the pilot signals are received during a frame including preamble symbols followed by pilot symbols.

11. The ground receiver system of claim 9, wherein estimating the frequency offsets and phase offsets, comprises: applying a discrete Fourier transform (DFT) to the first CSI.

12. The ground receiver system of claim 9, wherein adjusting the preamble signals comprises:
utilizing the frequency offsets and the phase offsets to remove a frequency offset and phase offset from each of the preamble signals; and
applying a matched root-raised-cosine (RRC) filter to each of the preamble signals.

13. The ground receiver system of claim 12, wherein estimating the first CSI, comprises:
obtaining, based on the second sequences of pilot symbols, a matrix $X_p[p]$ of MIMO-specific vectors of frame pilots, where $X_p[p]=[\underline{x}_{p,1},\underline{x}_{p,2}, \ldots ,x_{p,M_s}]^T$, and $M_s$ is a number of the transmitters;
representing, based on the first sequences of pilot symbols, a corresponding received matrix of pilots, $Y_p[p]$, as $Y_p[p]=H_p[p]\cdot X_p[p]+W_{d,p}[p]$, where $H_p[p]$ represents CSI for a pilot, is an index of the pth pilot, $p=1,2, \ldots , N_p$, and $W_{d,p}[p]$ includes noise contributions for a pilot; and
deriving, based on a least squares estimate, the first CSI as $\hat{H}_p[p]=Y_p[p]\cdot X_p{}^H[p]\cdot (X_p[p]X_p{}^H[p])^{-1}$.

14. The ground receiver system of claim 12, wherein the second CSI of the downlink between an $m_g$th gateway and $m_s$th satellite transmission is given by $$\hat{H}_{d,overall}|_{m_g,m_s} = \frac{\underline{x}_{amb,m_s}^H \cdot \underline{\tilde{y}}_{m_g,m_s}}{\underline{x}_{amb,m_s}^H \cdot \underline{x}_{amb,m_s}},$$

where $x_{amb,m_s}$ is the vector of symbols from a preamble orthogonal Walsh-Hadamard (WH) sequence specific to an $m_s$th satellite transmission,
and $y\tilde{}_{m_g,m_s}$ represents a collection of a receive vector, associated with the downlink between the $m_g$th gateway and $m_s$th satellite transmission, across time samples of the preamble.

15. The ground receiver system of claim 9, wherein the operations further comprise:
determining, using the second CSI of the downlink, a post-interference term; and
applying the post-interference term to extracted receive symbols to compensate for inter-antenna interference at antennas of the receivers of the gateways.

* * * * *